(12) United States Patent
Takagi

(10) Patent No.: US 10,685,551 B2
(45) Date of Patent: Jun. 16, 2020

(54) INFORMATION PROCESSING SYSTEM, INFORMATION PROCESSING APPARATUS, AND INFORMATION PROCESSING METHOD

(71) Applicant: SONY CORPORATION, Tokyo (JP)

(72) Inventor: Yoshinori Takagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/315,214

(22) PCT Filed: Apr. 13, 2017

(86) PCT No.: PCT/JP2017/015167
§ 371 (c)(1),
(2) Date: Jan. 4, 2019

(87) PCT Pub. No.: WO2018/016142
PCT Pub. Date: Jan. 25, 2018

(65) Prior Publication Data
US 2019/0156650 A1    May 23, 2019

(30) Foreign Application Priority Data
Jul. 21, 2016 (JP) ................. 2016-143537

(51) Int. Cl.
*G08B 21/22* (2006.01)
*G08B 27/00* (2006.01)
(Continued)

(52) U.S. Cl.
CPC .............. *G08B 21/22* (2013.01); *G06F 3/14* (2013.01); *G08B 27/003* (2013.01); *H04N 21/41* (2013.01);
(Continued)

(58) Field of Classification Search
CPC .................. G08B 21/22; G06F 3/14
(Continued)

(56) References Cited

U.S. PATENT DOCUMENTS

2013/0188835 A1* 7/2013 Higa ................. G06K 9/00268
382/103
2013/0281798 A1* 10/2013 Rau ..................... A61B 5/4884
600/301
(Continued)

FOREIGN PATENT DOCUMENTS

| JP | 09-276237 A | 10/1997 |
|----|----|----|
| JP | 2002-300602 A | 10/2002 |

(Continued)

OTHER PUBLICATIONS

International Search Report and Written Opinion of PCT Application No. PCT/JP2017/015167, dated Jul. 4, 2017, 6 pages of ISRWO.

*Primary Examiner* — Ojiako K Nwugo
(74) *Attorney, Agent, or Firm* — Chip Law Group

(57) ABSTRACT

Provided is an information processing system, an information processing apparatus, and an information processing method, which are capable of achieving all of crime prevention, disaster prevention, and activation of local community by appropriately conveying an indoor state to the outside while distancing from physical contact. The information processing system includes a detecting unit that detects a feeling of one or more persons located indoors on the basis of sensor data obtained by sensing an indoor state; and a control unit configured to perform control such that a captured image obtained by imaging the indoor state is output to an outdoor display apparatus in a case in which a value of a feeling of at least any one person among the detected feelings satisfies a predetermined condition.

11 Claims, 16 Drawing Sheets

(51) Int. Cl.
  *H04N 21/41* (2011.01)
  *G06F 3/14* (2006.01)
  *H04N 7/18* (2006.01)
  *G08B 25/12* (2006.01)

(52) U.S. Cl.
  CPC ....... *G08B 25/12* (2013.01); *G09G 2330/021* (2013.01); *G09G 2354/00* (2013.01); *G09G 2370/02* (2013.01); *G09G 2380/06* (2013.01); *G09G 2380/08* (2013.01); *H04N 7/18* (2013.01)

(58) Field of Classification Search
  USPC ....................................................... 340/573.1
  See application file for complete search history.

(56) References Cited

U.S. PATENT DOCUMENTS

| | | | | |
|---|---|---|---|---|
| 2014/0067392 A1* | 3/2014 | Burke | ..................... | G10L 15/22 704/236 |
| 2014/0344205 A1* | 11/2014 | Luna | ...................... | G06N 5/025 706/47 |
| 2014/0347181 A1* | 11/2014 | Luna | ................ | H04M 1/72569 340/539.22 |
| 2016/0104045 A1* | 4/2016 | Cho | ................... | G06K 9/00751 386/223 |
| 2016/0232625 A1* | 8/2016 | Akutagawa | ....... | G06F 16/90324 |
| 2016/0344569 A1* | 11/2016 | Chun | ................ | G06F 3/04842 |

FOREIGN PATENT DOCUMENTS

| | | |
|---|---|---|
| JP | 2006-200176 A | 8/2006 |
| JP | 2006-254222 A | 9/2006 |

* cited by examiner

FIG. 6
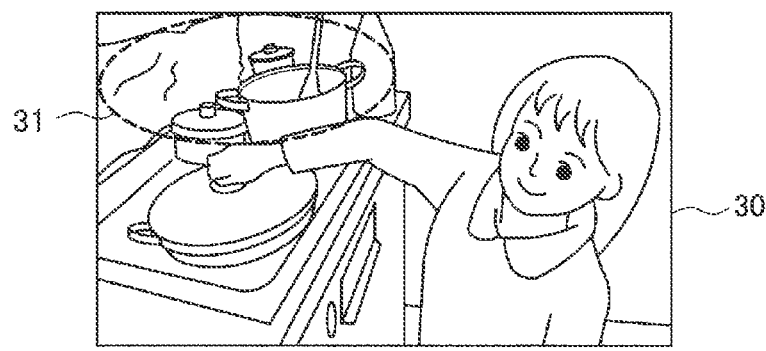
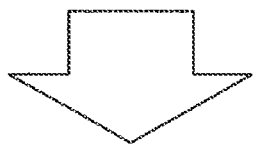
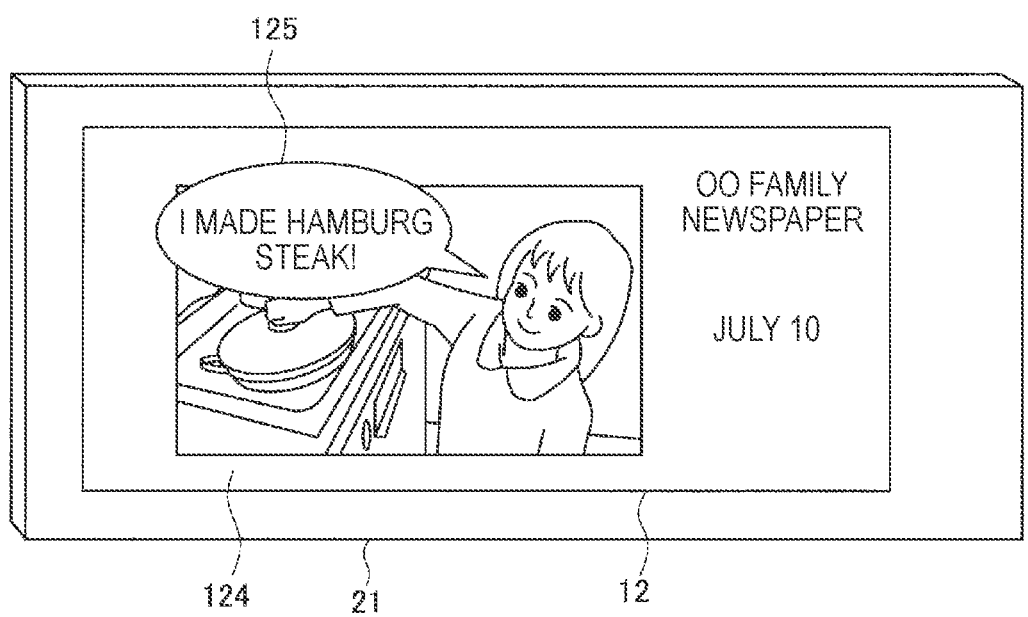

FIG. 15
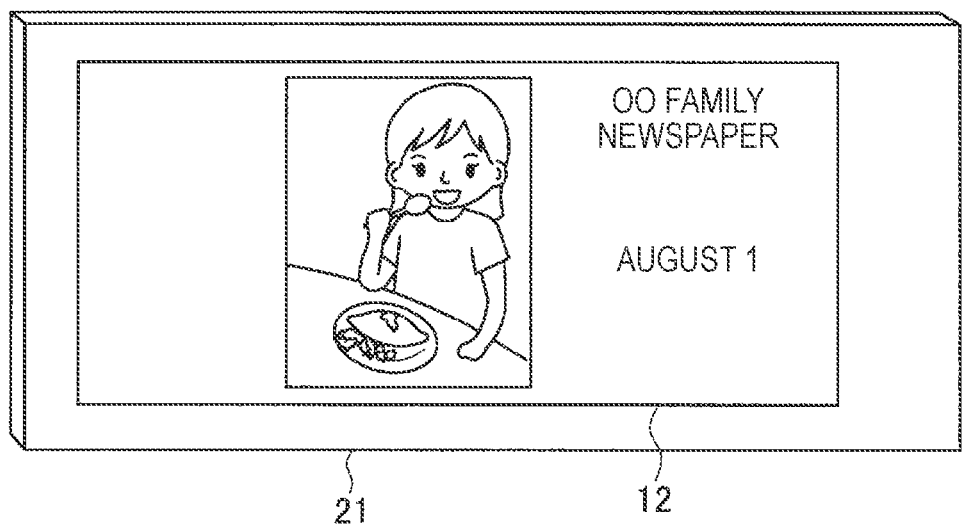
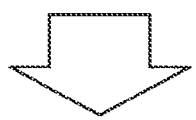
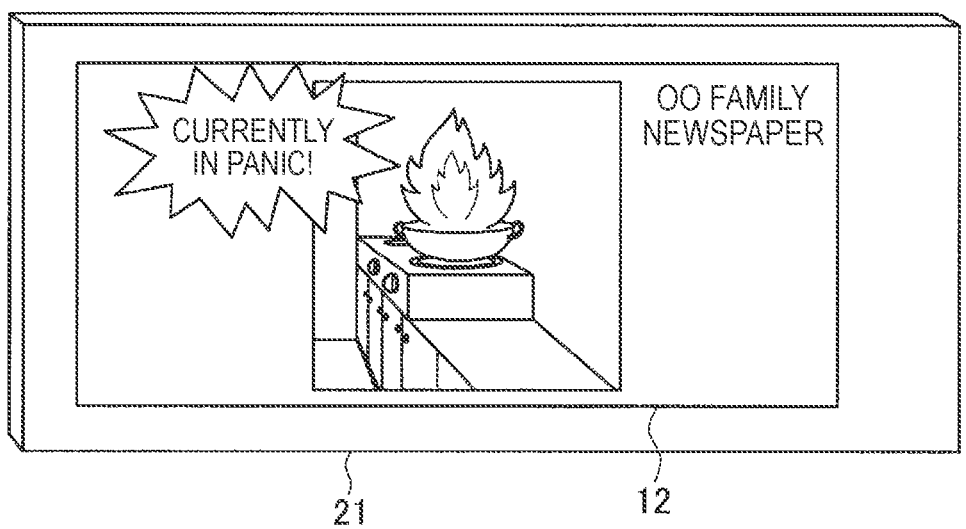

INFORMATION PROCESSING SYSTEM, INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2017/015167 filed on Apr. 13, 2017, which claims priority benefit of Japanese Patent Application No. JP 2016-143537 filed in the Japan Patent Office on Jul. 21, 2016. Each of the above-referenced applications is hereby incorporated herein by reference in its entirety.

TECHNICAL FIELD

The present disclosure relates to an information processing system, an information processing apparatus, an information processing method, and a program.

BACKGROUND ART

Communication through "language" (verbal communication) is used most often as existing communication. The communication through language is superior in information transmission. For example, conveying feelings to residents located indoors is possible by way of the communication through language. On the other hand, it is not preferable in terms of crime prevention or public morals for the feelings of persons located indoors to be overheard outdoors.

Further, in recent years, awareness of crime prevention has progressed along with the decline of local community, and various techniques related to home security such as introduction of surveillance cameras have been proposed. For example, a system in which, if an abnormality is detected by a sensor, abnormal information is transmitted to a center apparatus of a security company, and a sound or a video is output from a door intercom to intimidate a burglar, or a notification of the abnormal situation is given to a neighboring resident is disclosed in Patent Literature 1.

CITATION LIST

Patent Literature

Patent Literature 1: JP 2006-200176A

DISCLOSURE OF INVENTION

Technical Problem

Here, if a physically contactable space that functions as an interface with a neighboring resident such as an existing "porch" is installed in a house, it also becomes a physical security hole against crime, and it may cause hesitation in terms of crime prevention. For this reason, in recent years, both physical and social distances between neighboring residents have expanded, and local community has declined.

In this regard, the present disclosure proposes an information processing system, an information processing apparatus, an information processing method, and a program which are capable of achieving all of crime prevention, disaster prevention, and activation of local community by appropriately conveying an indoor state to the outside while distancing from physical contact.

Solution to Problem

According to the present disclosure, there is proposed an information processing system including: a detecting unit configured to detect a feeling of one or more persons located indoors on the basis of sensor data obtained by sensing an indoor state; and a control unit configured to perform control such that a captured image obtained by imaging the indoor state is output to an outdoor display apparatus in a case in which a value of a feeling of at least any one person among the detected feelings satisfies a predetermined condition.

According to the present disclosure, there is proposed an information processing apparatus including: a detecting unit configured to detect a feeling of one or more persons located indoors on the basis of sensor data obtained by sensing an indoor state; and a control unit configured to perform control such that a captured image obtained by imaging the indoor state is output to an outdoor display apparatus in a case in which a value of the detected feeling satisfies a predetermined condition.

According to the present disclosure, there is proposed an information processing method including: detecting, by a processor, a feeling of one or more persons located indoors on the basis of sensor data obtained by sensing an indoor state; and performing, by the processor, control such that a captured image obtained by imaging the indoor state is output to an outdoor display apparatus in a case in which a value of the detected feeling satisfies a predetermined condition.

According to the present disclosure, there is proposed a program causing a computer to function as: a detecting unit configured to detect a feeling of one or more persons located indoors on the basis of sensor data obtained by sensing an indoor state; and a control unit configured to perform control such that a captured image obtained by imaging the indoor state is output to an outdoor display apparatus in a case in which a value of the detected feeling satisfies a predetermined condition.

Advantageous Effects of Invention

As described above, according to the present disclosure, it is possible to achieve all of crime prevention, disaster prevention, and activation of local community by appropriately conveying an indoor state to the outside while distancing from physical contact.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram for describing generation of image content using a captured image that has undergone image processing according to the second embodiment.

FIG. 15 is a diagram illustrating a display example of panic notification content according to the present embodiment.

MODE(S) FOR CARRYING OUT THE INVENTION

Figure 1:
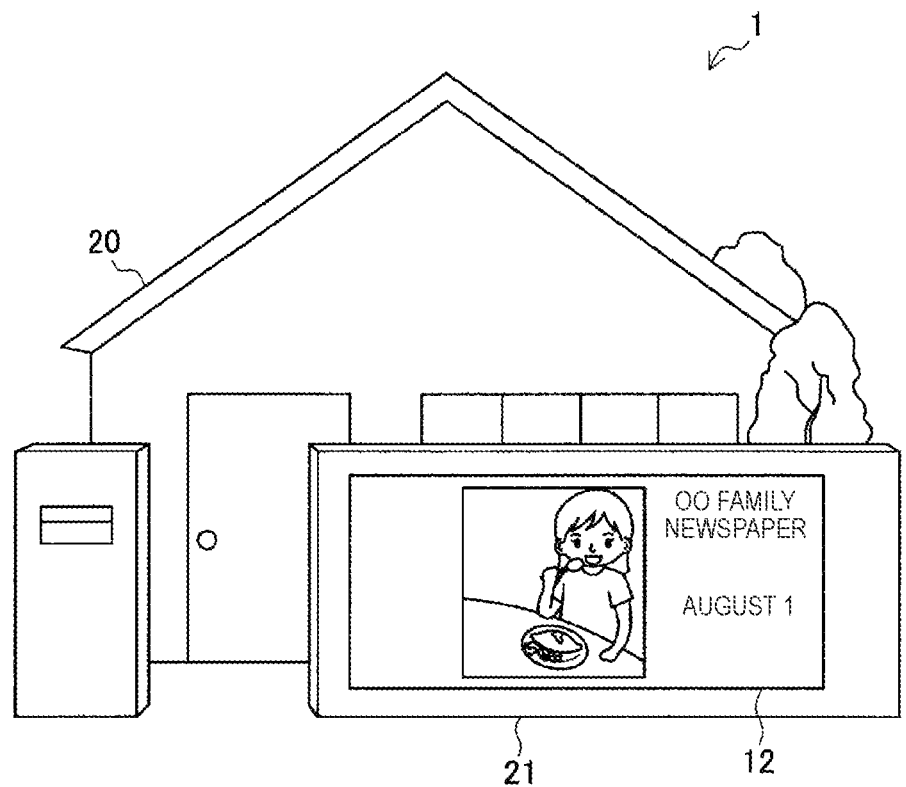
FIG. 1 illustrates an overview of an information processing system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description is given in the order below.
1. Outline of information processing system according to an embodiment of the present disclosure
2. Embodiments
2-1. First embodiment
2-2. Second embodiment
2-3. Third embodiment
2-4. Fourth embodiment
2-5. Fifth embodiment
2-6. Sixth embodiment
2-7. Seventh embodiment
3. Emergency response
4. Hardware configuration
5. Conclusion

1. Outline of Information Processing System According to an Embodiment of the Present Disclosure First, description is given of an outline of an information processing system according to the present embodiment. FIG. 1 is an illustration describing an outline of an information processing apparatus according to the present embodiment. As illustrated in FIG. 1, in an information processing system according to the present embodiment, an indoor state is displayed on an output apparatus 12 installed on a fence 21 of a house 20, and thus it is possible to achieve all of crime prevention, disaster prevention, and activation of local community by appropriately conveying an indoor state to the outside while distancing from physical contact.

An installation place of the output apparatus 12 is not limited to the fence 21 and may be any place which that is visible from the outside such as a wall of the house 20.
(Background)

As described above, in recent years, local community has declined as the awareness of crime prevention has progressed. For example, surveillance cameras have been increasingly introduced into private homes, and although the introduction of surveillance cameras has been effective in deterring crimes, this exposes suspicion and is likely to worsen relationships with neighboring residents. If residents are suspicious of each other, local community further declines.

On the other hand, if an interface in which physical contact with a neighbor is possible such as an existing "porch" is installed in a house, it also becomes a physical security hole against crime, and causes hesitation in terms of crime prevention. Therefore, both physical and social distances between neighboring residents are increasing.

In this regard, in the present embodiment, as described with reference to FIG. 1, it is possible to achieve all of crime prevention, disaster prevention, and activation of local community by appropriately conveying an indoor state to the outside from the output apparatus 12 installed outdoors while avoiding physical contact.

The outline of the information processing system according to the present embodiment is described as above. Next, description is given of embodiments of the information processing system according to the present embodiment, with reference to the drawings.

2. Embodiments

2-1. First Embodiment

First, an information processing system 1-1 according to a first embodiment of the present disclosure will be described with reference to FIGS. 2 and 3.
(2-1-1. Configuration)

Figure 2:
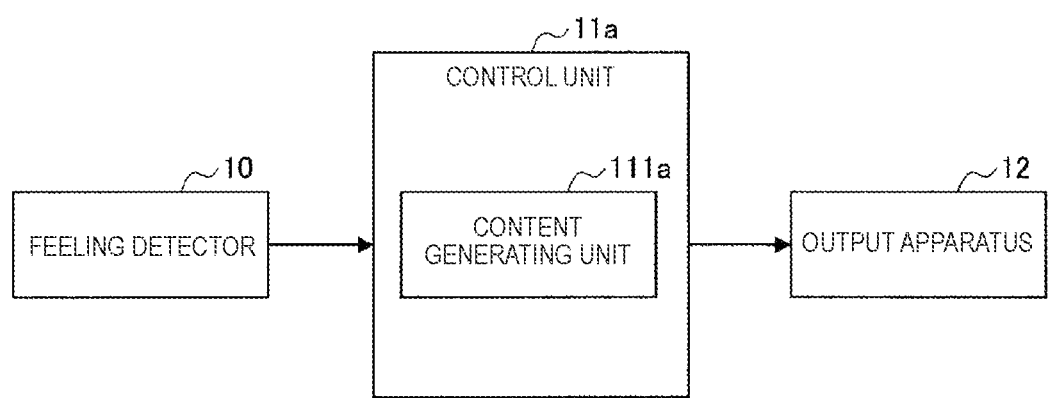
FIG. 2 is a block diagram illustrating a configuration example of an information processing system according to a first embodiment.

FIG. 2 is a block diagram illustrating a configuration example of an information processing system 1-1 according to a first embodiment. As illustrated in FIG. 2, the information processing system 1-1 includes a feeling detector 10, a control unit 11a, and an output apparatus 12.

The feeling detector 10 has a function of detecting a feeling of a user located indoors. For example, the feeling detector 10 may recognize a facial image of the user on the basis of a captured image captured by a camera installed indoors, and quantify the user feeling on the basis of the facial image (for example, a degree of a smile). Further, it is also possible for the feeling detector 10 to recognize conversation contents, a voice tone, etc. of a user on the basis of the user's voice collected by a microphone, to thereby quantify the user feeling. Furthermore, it is also possible for the feeling detector 10 to recognize the user's bio-information (pulse, heartbeat, perspiration amount, brain wave, body temperature, etc.) detected by a biosensor, to thereby quantify the user feeling. As described in, for example, JP 2005-64839A, as a specific example of an analysis of a feeling by using bio-information, a feeling parameter value may be calculated on the basis of a plurality of kinds of digitalized pieces of bio-information by using a learned feeling model or a re-learned feeling model for individual users. Further, as described in JP 2007-41988A, in order to recognize the user feeling with higher precision, the user feeling may be estimated by extracting a characteristic amount on the basis of information such as a facial expression, a gesture, a voice of the user. Furthermore, the user feeling may be estimated on the basis of meta-information of the contents which the user is viewing, and the user feeling may be recognized on the basis of both of these estimated results.

The control unit 11a according to the present embodiment functions as an operation processing unit and a control unit, and controls the entire operation in the information processing system 1-1 according to various kinds of programs. The control unit 11a is achieved by an electric circuit such as a CPU (Central Processing Unit) or a microprocessor. Further, the control unit 11a may include ROM (Read Only Memory) that stores programs to be used, operation parameters, etc., and RAM (Random Access Memory) that temporarily stores parameters that change appropriately, etc. In addition, the control unit 11a according to the present embodiment may be achieved by an information processing apparatus such as a home agent that is coupled to a home network, and may be separated from the feeling detector 10 or the output apparatus 12.

Further, a control unit 11a according to the present embodiment also functions as a content generating unit 111a. The content generating unit 111a generates content to be output to the output apparatus 12 in response to a feeling of a person located indoors detected by a feeling detector 10. For example, the content generating unit 111a may generate content of a wall newspaper format illustrated in FIG. 1 on the basis of a captured image captured indoors when a detected feeling exceeds a predetermined threshold value. Such a captured image may be captured by a camera installed indoors or may be captured by a user with a smartphone, a handy cam, or the like. Further, the captured image can be either a still image or a moving image.

The output apparatus 12 outputs content (an image, a sound, or the like) generated by the content generating unit 111a under the control of the control unit 11a. For example, the output apparatus 12 is realized by a display apparatus. The display apparatus may be, for example, a liquid crystal display (LCD), an organic electroluminescence (EL) display, or the like or may be an electronic paper which has been developed in recent years. The electronic paper is substantially zero in standby power in a display, is an "electronic device," and is useful as a "building material" which can be installed on a fence or a wall as well. In the present embodiment, for example, a huge electronic paper is installed on a fence or a wall as the output apparatus 12.

Figure 3:
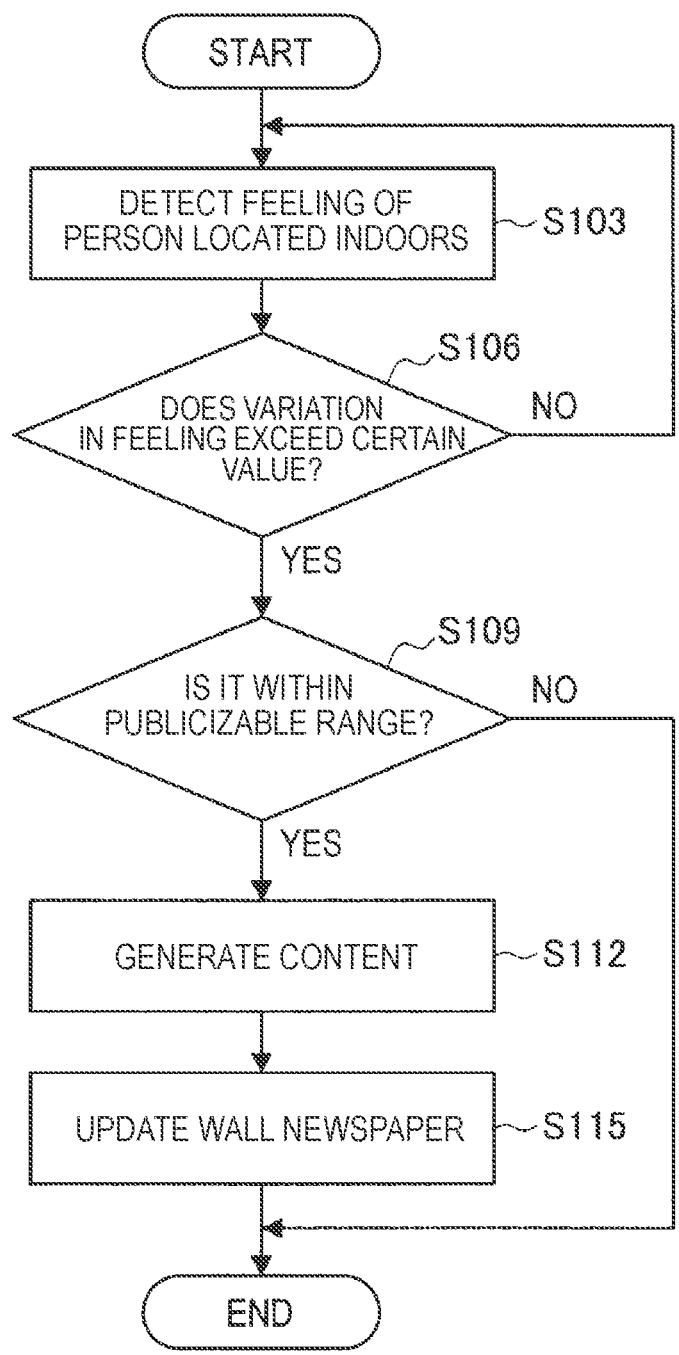
FIG. 3 is a flowchart illustrating operation processing according to the first embodiment.

Next, description is given of operation processing of the information processing system 1-1 according to the present embodiment with reference to the FIG. 3. FIG. 3 is a flowchart illustrating operation processing according to a first embodiment.

As illustrated in FIG. 3, the information processing system 1-1 according to the present embodiment first detects a feeling of a person in a house by the feeling detector 10 (step S103). For example, the feeling detector 10 analyzes a facial expression of the person located indoors consecutively photographed by a camera installed indoors, and quantifies each feeling of the person.

Then, the control unit 11a determines whether or not a variation in the feeling detected by the feeling detector 10 exceeds a certain value (a predetermined threshold value) (step S106). Alternatively, the control unit 11a may determine whether or not the detected feeling value exceeds a predetermined value. Further, threshold values may be set for individual persons.

Then, in a case in which the certain value is exceeded (Yes in step S106), the control unit 11a determines whether or not the detected feeling value is within a preset shareable range (step S109).

Then, in a case in which the detected feeling value is within the shareable range (Yes in step S109), the content generating unit 111a generates content (step S112). For example, in a case in which a variation in a feeling of "joy" of a person located indoors exceeds a certain value, and it is within the shareable range, the content generating unit 111a generates image content of a wall newspaper format displayed on the output apparatus 12 of FIG. 1 (for example, a newspaper format layout image including a headline, a date, and a captured image) on the basis of the captured image of the person imaged when the feeling is detected.

Then, the control unit 11a outputs the generated image content to the output apparatus 12, and updates the image content in a case in which a previous wall newspaper is displayed on the output apparatus 12 (step S115).

On the other hand, in a case in which it is not within the shareable range (No in step S109), the control unit 11a stops without generating content or updating the wall newspaper.

The operation process described above can be repeated continuously or periodically, and a notification of the indoor state can be appropriately given to the outside in accordance with the feeling of the person located indoors. Neighboring residents can know of a recent event of a resident in the house by seeing the wall newspaper displayed on the output apparatus 12 of the fence 21, leading to the activation of local community.

Further, the operation process of the information processing system 1-1 is an example, and the present embodiment is not limited thereto. For example, the information processing system 1-1 may detect a feeling (a feeling of a photographer or a subject) when the user photographs a scene desired to be kept as a keepsake and generate image content on the basis of the captured image in a case in which a certain value is exceeded. Further, the information processing system 1-1 may present the generated image content to the user and output the generated image content to the output apparatus 12 in a case in which approval is given by the user. Further, the information processing system 1-1 may present the generated image content to the user so that the generated image content can be edited by user. In this case, the information processing system 1-1 may use a communication terminal of the user such as a smart phone or a PC as the interface.

2-2. Second Embodiment

In the first embodiment described above, the captured image is used as the image content without change, but the present disclosure is not limited thereto, and a voice at the time of imaging may be converted to text and added, or the captured image may be partially processed and used. An information processing system 1-2 according to a second embodiment of the present disclosure will be described below with reference to FIGS. 4 to 6.

(2-2-1. Configuration)

Figure 4:
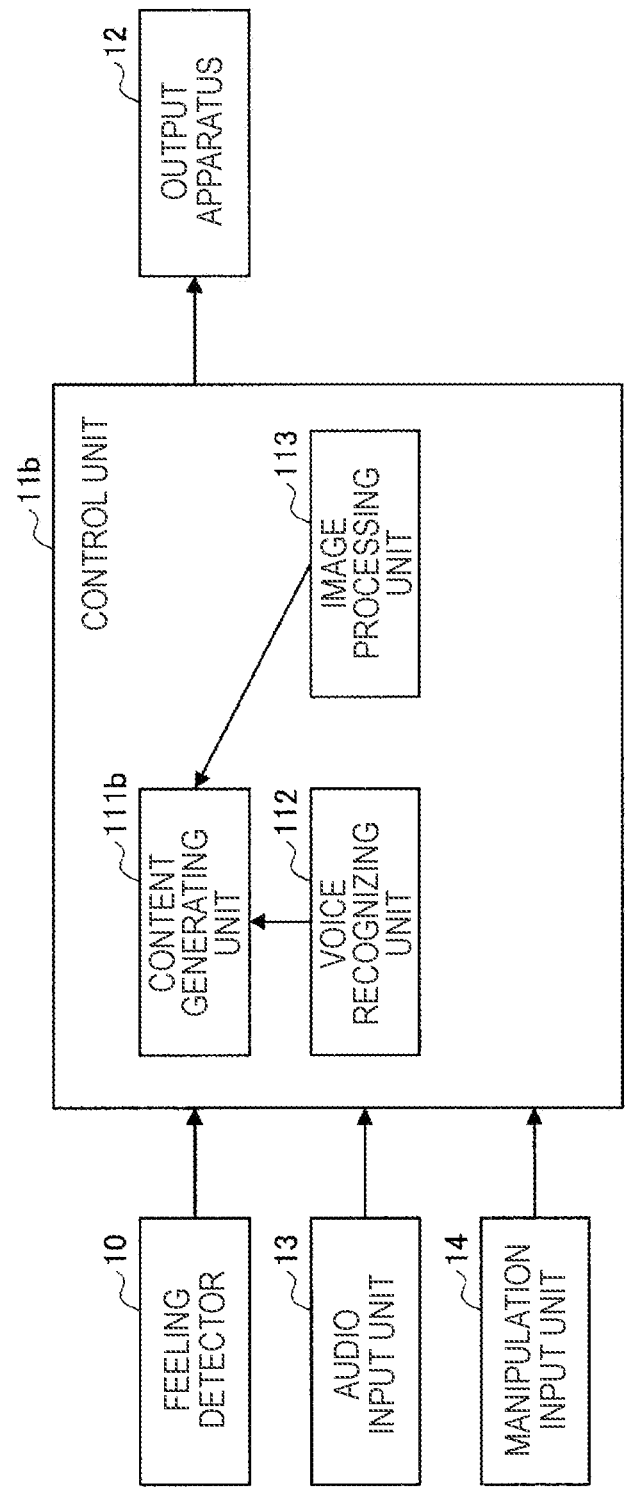
FIG. 4 is a block diagram illustrating a configuration example of an information processing system according to a second embodiment.

FIG. 4 is a block diagram illustrating an example of a configuration of the information processing system 1-2 according to the second embodiment. As illustrated in FIG. 4, the information processing system 1-2 includes a feeling detector 10, a control unit 11b, an output apparatus 12, an audio input unit 13, and a manipulation input unit 14.

The feeling detector 10 and the output apparatus 12 are similar to those of the first embodiment described with reference to FIG. 2.

The audio input unit 13 is realized by a microphone installed in a house, a microphone amplifier section for amplifying an audio signal obtained by the microphone, and an A/D converter for converting the audio signal into a digital signal, and outputs the audio signal to the control unit 11b.

The manipulation input unit 14 receives a manipulation input from a user and outputs manipulation content to the control unit 11b. The manipulation input unit 14 may be a touch sensor, a pressure sensor, or a proximity sensor installed integrally with an indoor display unit. Alternatively, the manipulation input unit 14 may be a physical configuration such as a button, a switch, or a lever.

The control unit 11b functions as an arithmetic processing apparatus and a control apparatus, and controls overall operation of the information processing system 1-2 in accordance with various kinds of programs. Further, the control unit 11b according to the present embodiment functions as a content generating unit 111b, a voice recognizing unit 112, and an image processing unit 113.

The voice recognizing unit 112 has a function of recognizing an audio signal collected by the audio input unit 13 and converting the audio signal into a character string. Further, the voice recognizing unit 112 may further perform syntax analysis or semantic analysis on the character string.

The image processing unit 113 has a function of processing the captured image captured by the camera in the house. For example, the image processing unit 113 can cut out and erase some of the captured images shared by the output apparatus 12. The image processing unit 113 according to the present embodiment may perform a preset process automatically or in accordance with a user manipulation.

The content generating unit 111b can generate content to be output to the output apparatus 12 on the basis of the character string of the voice recognized by the voice recognizing unit 112 or the captured image processed by the image processing unit 113.

(2-2-2. Image Content Example)

Here, an example of the image content generated by the present embodiment will be described with reference to FIGS. 5 and 6.

Figure 5:
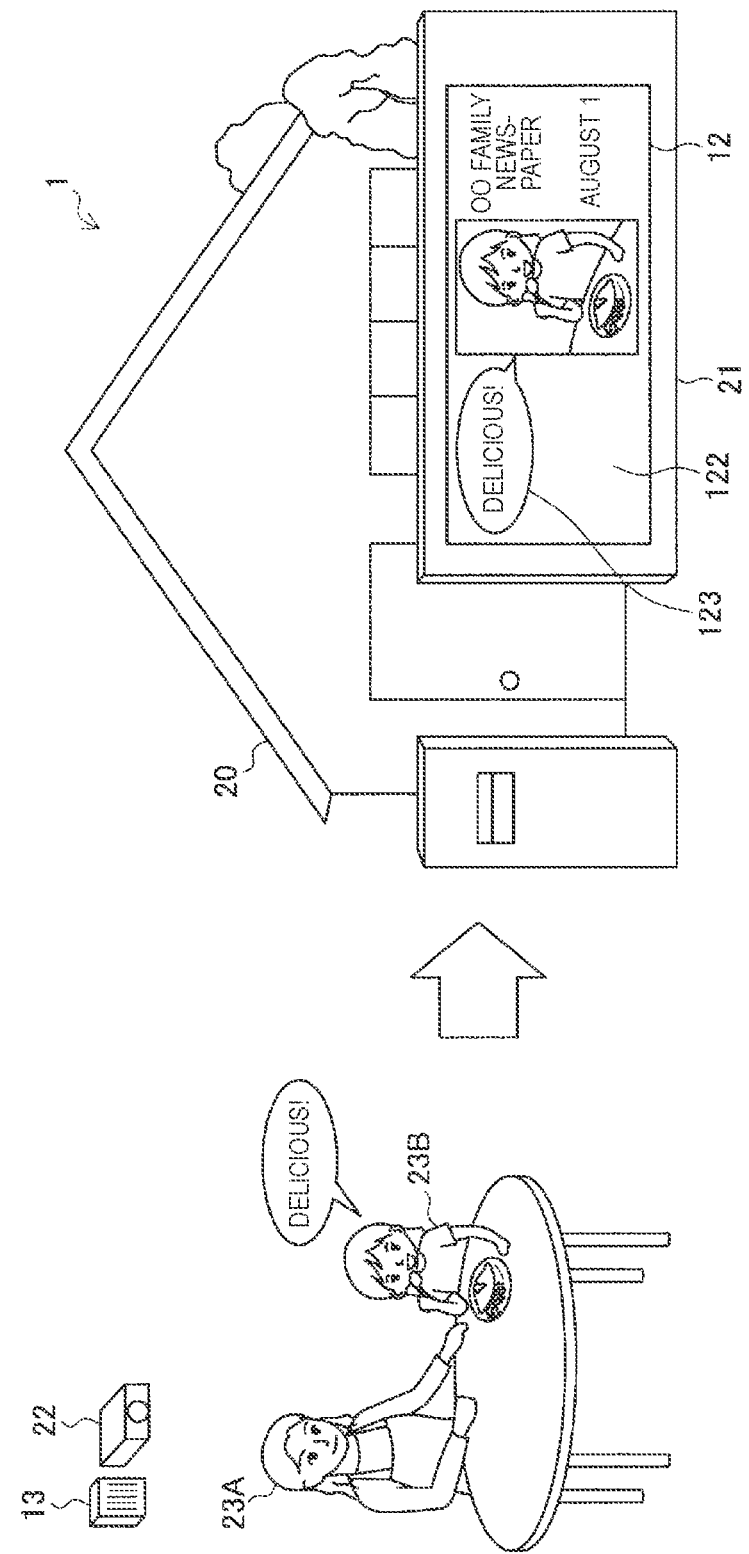
FIG. 5 is a diagram for describing generation of image content to which a character string obtained by voice recognition is added according to a second embodiment.

FIG. 5 is a diagram for describing generation of image content to which a character string obtained by voice recognition is added according to a second embodiment. As illustrated in FIG. 5, for example, when an indoor state is imaged by an indoor camera 22, and an indoor sound is collected by the audio input unit 13, feelings of a user 23A and a user 23B are continuously detected on the basis of the captured image and the sound. Then, for example, in a case in which the user 23B smiles, and the variation in the feeling value of "joy" exceeds a certain value, the content generating unit 111b generates image content 122 of a wall newspaper format layout on the basis of the captured image of the user 23B captured by the camera 22. At this time, a spoken voice "delicious!" of the user 23B when the variation in the feeling value exceeds the certain value is collected by the audio input unit 13 and converted into a character string by the voice recognizing unit 112.

The content generating unit 111b can generate the image content 122 by adding the character string to the captured image and give a notification indicating a situation in which the feeling value varies to neighboring residents in further detail. Further, the character string added to the image content may be the spoken voice of the user starting before and after the imaging timing of the captured image captured when the feeling value varies.

Further, although a method of arranging the character string is not particularly limited, for example, face recognition may be performed on the captured image, a mouth portion of a face of the user 23B shown in the captured image may be detected, and the character string may be displayed in a word balloon form near the mouth portion. Specifically, a word balloon image 123 illustrated in FIG. 5 corresponds thereto.

FIG. 6 is a diagram for describing generation of the image content using the captured image that has undergone the image processing according to the second embodiment. For example, the captured image captured in the house includes a part which is desired not to be shared such as a messy part or a dirty part. For example, the control unit 11b specifies a part 31 that is desired not to be shared such as a messy part, a dirty part, or the like from a captured image 60 illustrated in FIG. 6 automatically by object recognition or the like or on the basis of an instruction from the user. Then, the image processing unit 113 can perform a process of deleting the part 31 which is desired not to be shared, or a process of concealing it with a word balloon 125 or the like illustrated in FIG. 6 and generate image content 124 in which the part 31 desired not to be shared is hidden.

As described above, in the second embodiment, when a notification of the indoor state is appropriately given to the outside in accordance with the feeling of the person located indoors, it is possible to add the character string based on the spoken voice to the image and notify of the indoor state in further detail. Further, it is possible to hide a part which is desired not to be shared such as a messy part or a dirty part from the captured images to be notified of. As described above, in the present embodiment, it is possible to further activate local community and improve the usability.

2-3. Third Embodiment

In each of the above-described embodiments, the detection of the feeling and the generation of the image content are performed on the basis of the captured image captured in real time from the camera installed in the room, the smartphone of the user, or the like, but the present disclosure is not limited thereto. For example, the information processing system 1 according to the present disclosure may detect the user feeling when a previous captured image, a previous recorded video, or the like is viewed and generate the image content to be output to the output apparatus 12 in conjunction with a content reproducing apparatus. An information processing system 1-3 according to a third embodiment of the present disclosure will be described below with reference to FIGS. 7 and 8.

(2-3-1. Configuration)

Figure 7:
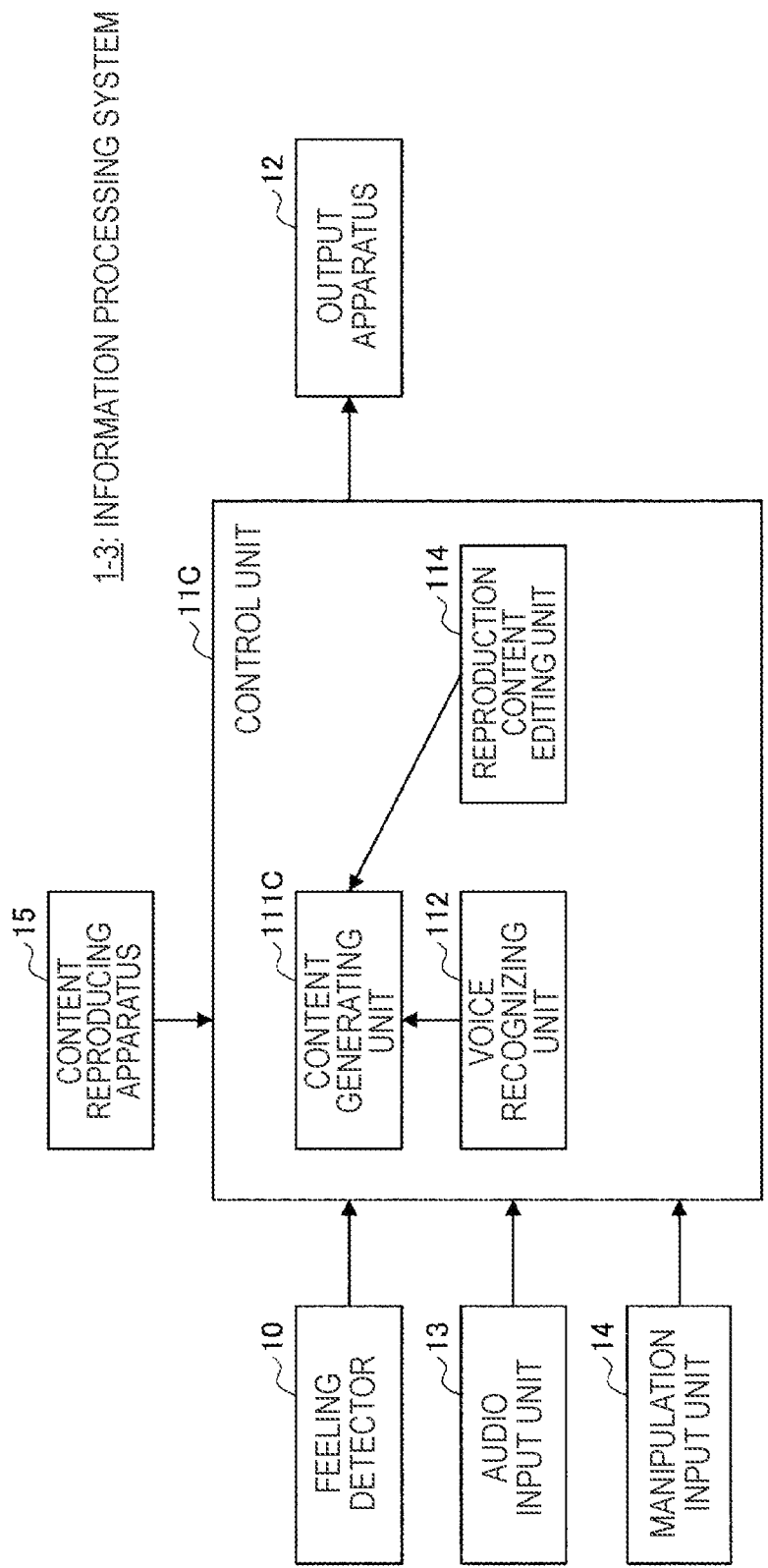
FIG. 7 is a block diagram illustrating a configuration example of an information processing system according to a third embodiment.

FIG. 7 is a block diagram illustrating an example of a configuration of the information processing system 1-3 according to the third embodiment. As illustrated in FIG. 7, the information processing system 1-3 includes a feeling detector 10, a control unit 11c, an output apparatus 12, an audio input unit 13, a manipulation input unit 14, and a content reproducing apparatus 15.

The feeling detector 10, the output apparatus 12, the audio input unit 13, and the manipulation input unit 14 are similar to those of the second embodiment described with reference to FIG. 4.

The content reproducing apparatus 15 has a function of reproducing a previous captured image, a previous recorded video, or the like. For example, the content reproducing apparatus 15 is realized by a television, a recorder, a smartphone, a PC, or the like. The content reproducing apparatus 15 outputs content being reproduced to the control unit 11c if necessary.

The control unit 11c functions as an arithmetic processing apparatus and a control apparatus, and controls overall operation of the information processing system 1-3 in accordance with various kinds of programs. Further, the control unit 11c according to the present embodiment functions as a content generating unit 111c, a voice recognizing unit 112, and a reproduction content editing unit 114.

Similarly to the second embodiment described with reference to FIG. 4, the voice recognizing unit 112 recognizes the audio signal collected by the audio input unit 13, converts the audio signal into a character string, and further performs syntax analysis or semantic analysis on the character string.

The reproduction content editing unit 114 has a function of selecting reproduction content and inputting a caption on the basis of content extracted from the content reproduced by the content reproducing apparatus 15. In the present embodiment, for example, if the variation in the feeling value of the user who is watching content such as a movie or the like which is being reproduced by the content reproducing apparatus 15 exceeds a certain value, the control unit 11c acquires details of the content being viewed by the user from the content reproducing apparatus 15 and edits the reproduction content through the reproduction content editing unit 114.

The edited image is output to the output apparatus 12 and shared with an unspecified number of people as will be described later, but there is also concern of the image being shared causing a problem in terms of copyright. In this case, since a sort of advertisement effect can be also obtained when it is shared, a mechanism for obtaining permission for use in the information processing system 1 from a copyright holder may be installed. The details of a system for obtaining permission for use of content from the copyright holder are not particularly limited, but for example, a permission request may be sent to the copyright holder if necessary, or information indicating that the use of the present system is permitted by the copyright holder in advance may be acquired from metadata of the content.

The content generating unit 111c generates the content to be output to the output apparatus 12 on the basis of the image edited by the reproduction content editing unit 114. At this time, the content generating unit 111c may add a character string of a spoken voice of the user at the time of viewing of the reproduction content which is input from the audio input unit 13 and recognized by the voice recognizing unit 112.

(2-3-2. Image Content Example)

Here, an example of the image content generated by the present embodiment will be described with reference to FIG. 8.

Figure 8:
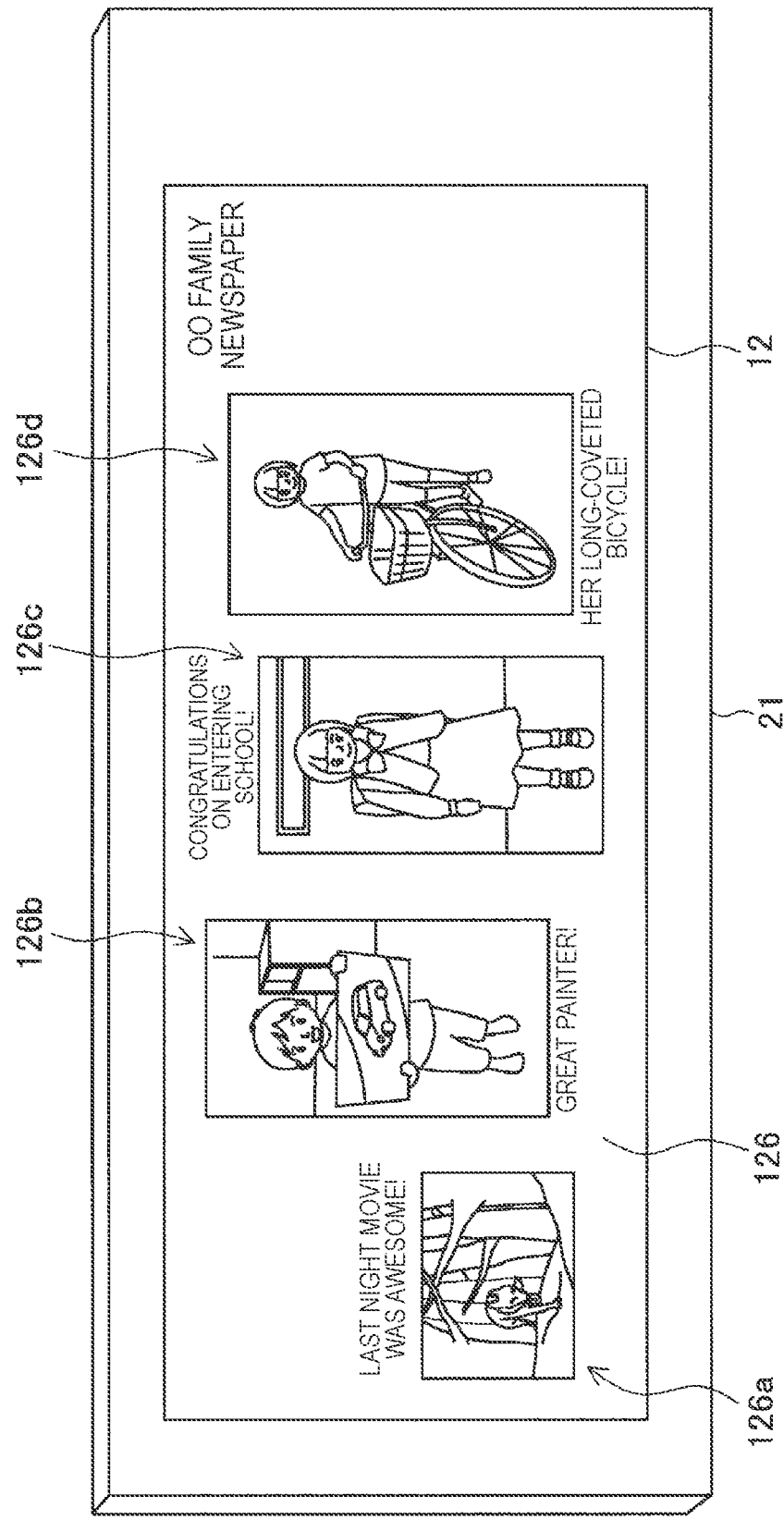
FIG. 8 is a diagram for describing generation of image content based on reproduction content according to a third embodiment.

FIG. 8 is a diagram for describing generation of the image content based on the reproduction content according to the third embodiment. In the example illustrated in FIG. 8, image content 126 generated on the basis of the reproduction content is displayed on the output apparatus 12 of the fence 21. In the image content 126, a plurality of pieces of image content 126a to 126d generated on the basis of the reproduction content are arranged with a layout such as a wall newspaper.

For example, the image content 126a is content which is generated by the content generating unit 111c on the basis of an image extracted from a movie since the variation in the feeling of the user (for example, "delightful," "excitement," or the like) exceeds a certain value while the user is watching the movie through the content reproducing apparatus 15. For example, a caption "Last night movie was awesome!" can be input arbitrarily from the manipulation input unit 14 by the user. Further, for example, an input from things such as various kinds of SNSs blogs or e-mails, chats, or messages transmitted or shared by the user may be changed to this.

For example, the image content 126b to 126d are content generated by the content generating unit 111c on the basis of an image extracted from a photograph or a moving image since the variation in the feeling of the user (for example, "happy," "delightful," or the like) exceeds a certain value while the user is viewing a photograph or a moving image taken by the user in the past by the content reproducing apparatus 15. For example, captions "great painted," "congratulations on entering school!," and "her long-coveted bicycle!" can be input arbitrarily from the manipulation input unit 14 by the user.

In the third embodiment described above, it is possible to notify of content which the person located indoors is viewing and delightful and further activate the local community.

2-4. Fourth Embodiment

The image content generated by the information processing system 1 is not limited to the example described above and may generate, for example, image content of a cartoon format (hereinafter also referred to as cartoon content) on the basis of the captured image or the spoken voice. An information processing system 1-4 according to a fourth embodiment of the present disclosure will be described below with reference to FIGS. 9 to 10.

(2-4-1. Configuration)

Figure 9:
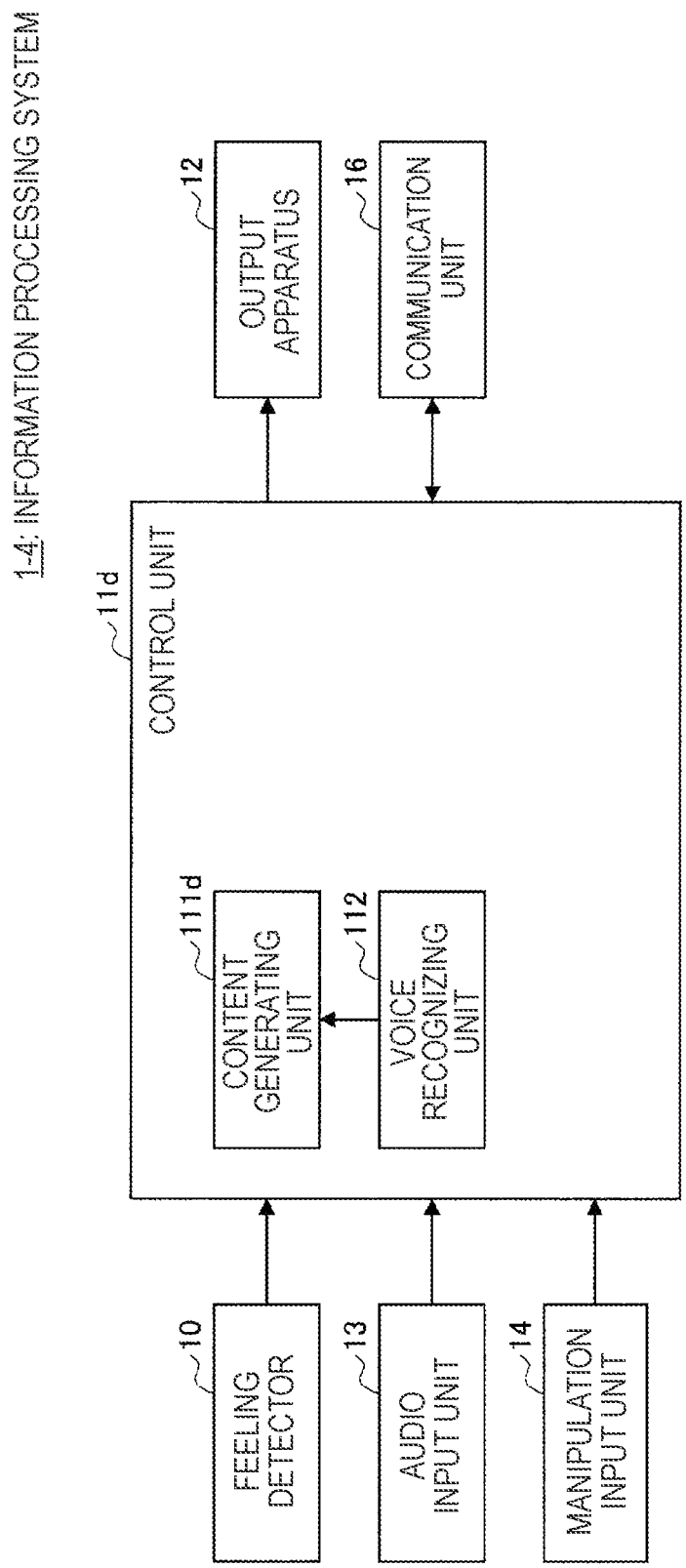
FIG. 9 is a block diagram illustrating a configuration example of an information processing system according to a fourth embodiment.

FIG. 9 is a block diagram illustrating an example of a configuration of the information processing system 1-4 according to the fourth embodiment. As illustrated in FIG. 9, the information processing system 1-4 includes a feeling detector 10, a control unit 11d, an output apparatus 12, an audio input unit 13, a manipulation input unit 14, and a communication unit 16.

The feeling detector 10, the output apparatus 12, the audio input unit 13, and the manipulation input unit 14 are similar to those described above with reference to FIGS. 4 and 7.

The control unit 11d functions as an arithmetic processing apparatus and a control apparatus, and controls an overall operation of the information processing system 1-4 in accordance with various kinds of programs. Further, the control unit 11d according to the present embodiment also functions as a content generating unit 111d and a voice recognizing unit 112.

In a case in which the variation in the user feeling detected by the feeling detector 10 exceeds a certain value, the content generating unit 111d generates the cartoon content to be output to the output apparatus 12 on the basis of the captured image of the user by the indoor camera and the spoken voice of the user which is collected by the audio input unit 13 and recognized by the voice recognizing unit 112. For example, the content generating unit 111d can generate a cartoon in which the feeling of the user is reflected in a story or a character using an automatic cartoon creation method described in JP 2008-305171A. More specifically, for example, the content generating unit 111d decides a frame of a type corresponding to a length of a sentence constituting text based on the captured image or spoken voice of the user (a frame corresponding to a display frame of a plurality of patterns used for each scene constituting a page of a cartoon). Then, the content generating unit 111d decides a facial expression of a character placed on the scene (for example, a face image of the user extracted from the captured image) and a word balloon frame in accordance with the feeling of the user. Then, the content generating unit 111d synthesizes the decided frame, the facial expression of the character (captured image), and the word balloon frame, arranges text in the word balloon frame, and creates a scene.

Further, the content generating unit 111d can also generate moving image content summarizing a moving image on the basis of metadata of a moving image captured by an indoor camera, a smartphone of the user, or the like. A moving image summarizing method may be, for example, a method performed by using interval metadata indicating an interval in which an object appears, as disclosed in, for example, JP 2012-249156A and JP 2013-25748A. Alternatively, a moving image summarizing method may be a method of appropriately synthesizing a historical image (a captured image located in front in a time axis) on the basis of a feature quantity of the captured image as disclosed in JP 2009-159330A. Then, the content generating unit 111d can generate content obtained by converting the summarized moving image into a cartoon form The content generating unit 111d outputs the generated cartoon content to the output apparatus 12 so that the neighboring resident is notified of it. In a case in which a display area of the output apparatus 12 is insufficient for the generated cartoon content, the information processing system 1-4 may cause a continuation to be displayed from an output apparatus installed in a neighboring house or a nearby fence.

The communication unit 16 is a communication module for performs transmission and reception of data with another apparatus in a wired/wireless manner. The communication unit 16 performs wireless communication with an external device directly or via a network access point in accordance with a scheme such as, for example, a wired local area network (LAN), a wireless LAN, wireless fidelity (Wi-Fi) (registered trademark), infrared communication, Bluetooth (registered trademark), or near field/contactless communication. For example, the communication unit 16 according to the present embodiment transmits the cartoon content or the like generated by the content generating unit 111d to the information processing system 1 in another house or receives the cartoon content or the like from the information processing system 1 in another house.

(2-4-2. Display Example of Cartoon Content)

Figure 10:
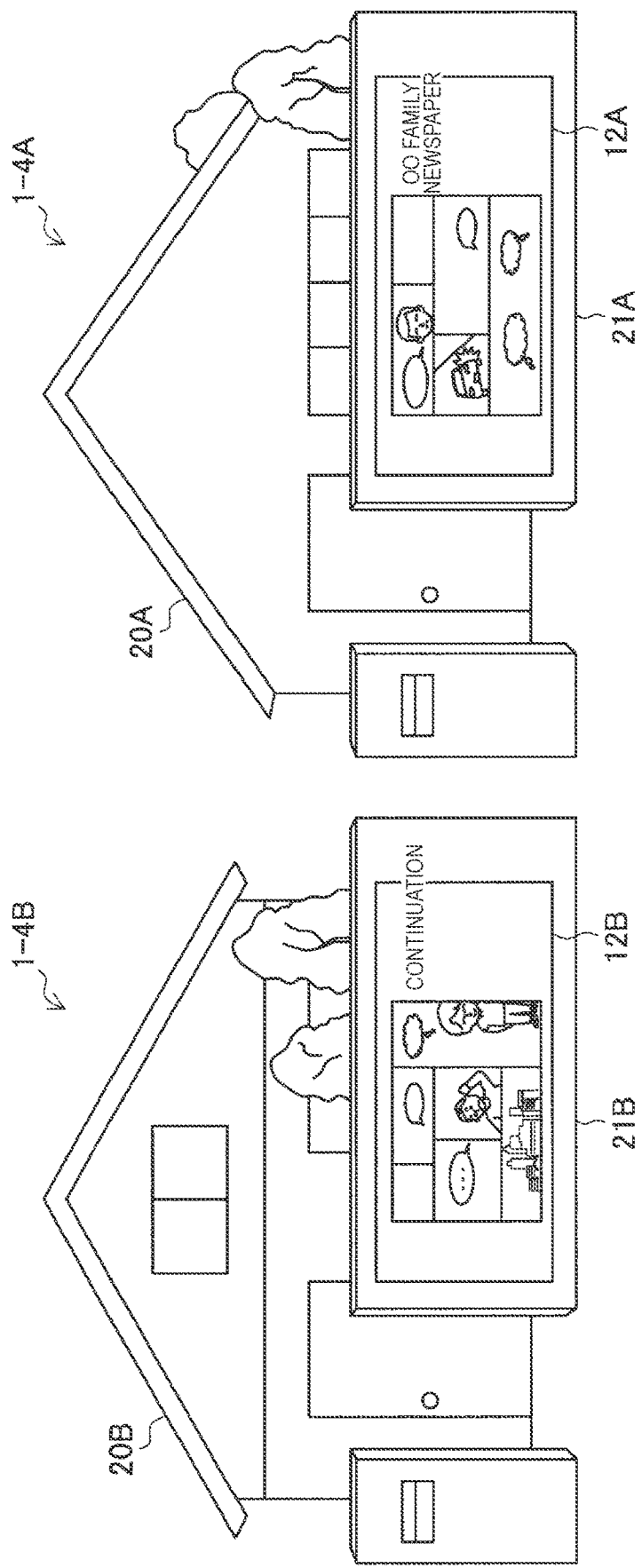
FIG. 10 is a diagram for describing interlocking of output apparatuses of a plurality of houses according to a fourth embodiment.

Here, a case in which the continuation of the cartoon content is displayed on a fence of a neighboring house will be described with reference to FIG. 10. FIG. 10 is a diagram for describing interlocking of the output apparatuses of a plurality of houses according to the present embodiment.

In FIG. 10, for example, an information processing system 1-4A detects a feeling of a person in a house 20A, and in a case in which the variation in the feeling value exceeds a certain value, the information processing system 1-4A generates cartoon content on the basis of a captured image (a still image or a moving image) captured when the feeling is detected and a collected user voice and causes the captured image to be displayed on an output apparatus 12A of an outdoor fence 21A. At this time, if a display area of an output apparatus 12A of the house 20A is insufficient for the cartoon content, the information processing system 1-4A accesses an information processing system 1-4B of a predetermined neighboring house 20B, transmits the cartoon content, and performs control such that subsequent cartoon content is displayed on the output apparatus 12B installed in the fence 21B of the neighboring house 20B as illustrated in FIG. 10.

As described above, in the present embodiment, the cartoon content is displayed on the output apparatus 12 of the fence 21, and thus it is possible to notify the neighbors of the feeling of the person located indoors or an event more easily.

2-5. Fifth Embodiment

In each of the above-described embodiments, the notification of the feeling or the state of the person located indoors is unilaterally given from the output apparatus 12 to the neighbors, but the present disclosure is not limited thereto, and for example, if an input outside a house is possible, it is possible to increase significance of existence as an infrastructure for area communication. An information processing system 1-5 according to a fifth embodiment of the present disclosure will be described below with reference to FIGS. 11 to 12.

Figure 11:
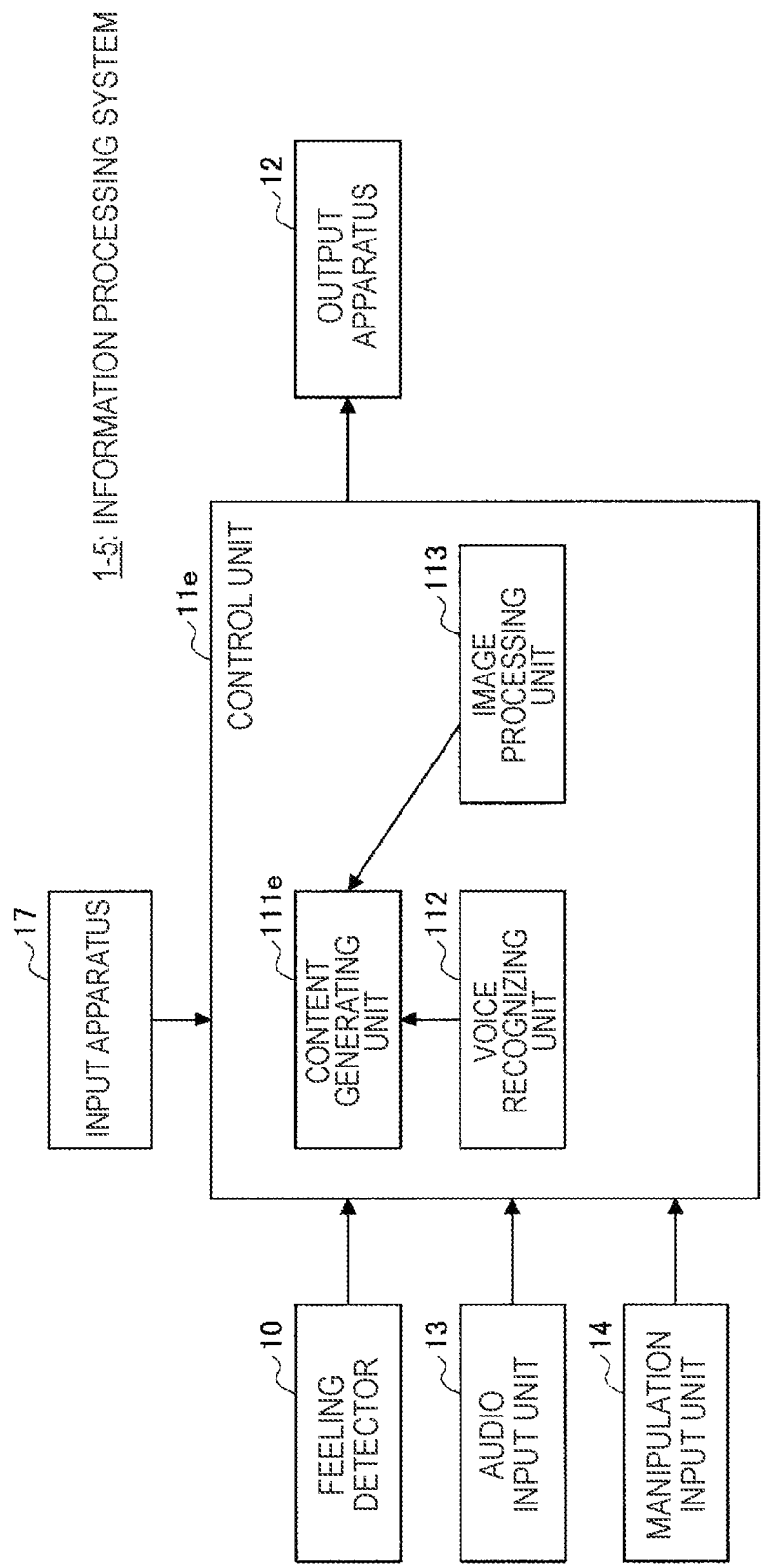
FIG. 11 is a block diagram illustrating a configuration example of an information processing system according to a fifth embodiment.

FIG. 11 is a block diagram illustrating an example of a configuration of the information processing system 1-5 according to the present embodiment. As illustrated in FIG. 11, the information processing system 1-5 includes a feeling detector 10, a control unit 11e, an output apparatus 12, an audio input unit 13, a manipulation input unit 14, and an input apparatus 17.

The feeling detector 10, the output apparatus 12, the audio input unit 13, and the manipulation input unit 14 are similar to those of the above-described embodiments described with reference to FIGS. 4, 7, and 9.

The input apparatus 17 has a function of receiving a comment or a writing to the image content displayed on the output apparatus 12. For example, the input apparatus 17 is installed on a display screen of the output apparatus 12 and receives a contact/proximity/contactless input performed by a pen-like attachment, a finger, or the like. Further, the input apparatus 17 may collects a voice of a person located outdoors by a microphone installed nearby the output apparatus 12 and receives a voice input. Further, in the case of the voice input, the voice input may be received in a case in which there is an explicit input start manipulation. For example, the input apparatus 17 may receive a voice input in a case in which any one of the wall newspaper images displayed on the output apparatus 12 is detected to be pushed by a touch sensor or the like.

The control unit 11e functions as an arithmetic processing apparatus and a control apparatus, and controls an overall operation of the information processing system 1-5 in accordance with various kinds of programs. Further, the control unit 11e according to the present embodiment also functions as a content generating unit 111e, a voice recognizing unit 112, and an image processing unit 113.

Figure 12:
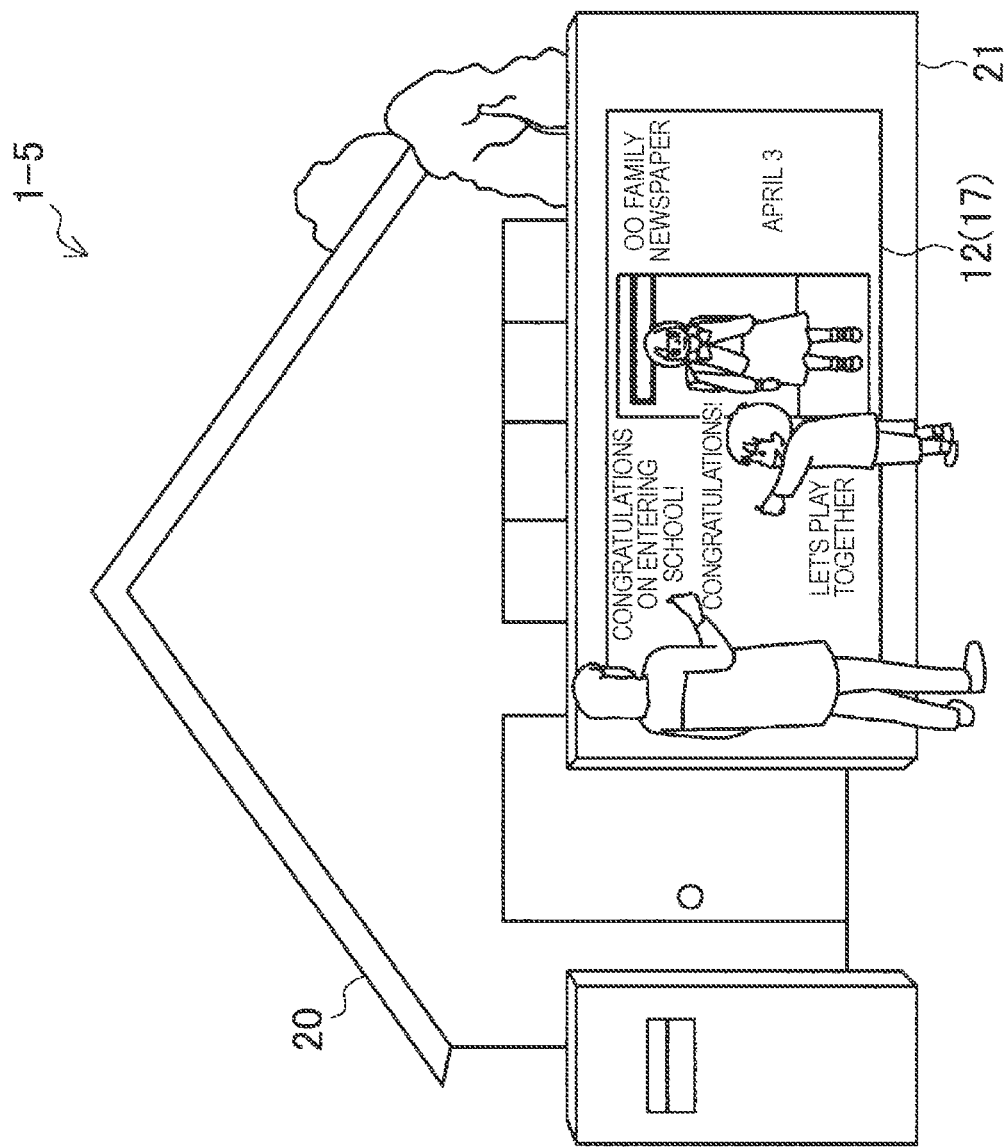
FIG. 12 is a diagram for describing an outdoor input according to a fifth embodiment.

The content generating unit 111e generates image content to be output to the output apparatus 12. Further, the content generating unit 111e reflects a comment or a writing input via the input apparatus 17 in the image content and outputs the resulting image content to the output apparatus 12. Here, FIG. 12 illustrates a diagram for describing an input from the outside of the house according to the present embodiment. As illustrated in FIG. 12, the information processing system 1-5 includes the input apparatus 17 (for example, a writable electronic paper) integrated with the output apparatus 12 installed in the outdoor fence 21. The information processing system 1-5 receives a writing on the image content displayed on the output apparatus 12 through the input apparatus 17, and displays the writing on the image content as illustrated in FIG. 12 (or rewriting may be able to be performed on the electronic paper regardless of the control of the control unit 11e). Accordingly, it is possible to obtain a response from the neighboring residents to the content displayed and notified on the output apparatus 12. Since the content to be written is electronically input and displayed, in a case in which it is annoying content, is contrary to public order and morals, or something that falls under slander, it may be prohibited from being displayed automatically or by censorship by the user. Further, when an "erase function" which can be also used by persons located outdoors is installed in the input apparatus 17 together, it can be expected that "inappropriate information" is driven out by a silent majority.

Further, in a case in which the voice input is received by the input apparatus 17 when any one part of the display screen of the output apparatus 12 is pushed, the content generating unit 111e may cause a voice-recognized character string to be displayed at the pushed part.

As described above, according to the present embodiment, it is possible not only to notify of the feeling or the state of the person located indoors but also to realize two-way communication by obtaining the response from the neighboring residents. As described above, it is possible to use the wall-type output apparatus 12 as a "next-generation porch" with the neighboring residents or as a "real regional SNS tool." Further, the input apparatus 17 is not limited to the above example and may be realized by, for example, a camera and receive the captured image. Further, a surveillance camera may be installed together, and a face image of a person who is writing may be recorded.

Further, but various information may be written for knowledge exchange of local residents regardless of whether or not content is not related to the image content displayed on the output apparatus 12. The wall type output apparatus 12 and the input apparatus 17 installed outdoors are used as a bulletin board in which a freely writing can be performed. At this time, writing content may be displayed in conjunction with another output apparatus installed at a remote place (an output apparatus or the like installed in a fence of another house) (synchronization control). Accordingly, it is possible to share, for example, information of suspicious individuals in an area. Further, at this time, it is also possible to arbitrarily designate an output destination from the input apparatus 17.

2-6. Sixth Embodiment

If an interactive input from the outside of the house is possible as in the fifth embodiment, a frequency of rewriting increases, and power consumption increases. In this regard, for example, a power saving effect can be obtained by localizing rewriting.

For example, in a case in which an electronic paper is used as the input/output apparatus in which the output apparatus 12 and the input apparatus 17 are integrated, a plurality of electronic papers may be arranged to form a huge electronic paper, and rewriting may be allowed only in an area in which there has been an input. Further, in a case in which a flat panel display (FPD) is used as the input/output apparatus, as low power consumption control for an LED backlight in the FPD, an inputtable part may be localized to a part (for example, the backlight is turned off in a part in which rewriting is turned off or the like).

Further, when the rewriting power is minimized as described above, for example, it is possible to cause the input/output apparatus to operate sufficiently even with energy acquired by energy harvest such as a solar cell.

As an example of the energy harvest, in addition to the solar cell, for example, a module for generating electric power by vibration of a vehicle or the like passing through a road in front of the fence 21 may be installed to thereby establish a power source system in which the input/output apparatus is self-powered. In this case, for example, the control unit 11 may update the image content such as the wall newspaper or the like displayed on the input/output apparatus in a case in which electric power is accumulated. Further, a hand-turned charger may be installed together so that a person who desires to perform a writing supplies electric power by him/herself.

2-7. Seventh Embodiment

If the indoor state or the feeling outdoors is notified of to the outside of the house, it is useful for countermeasures against regional medical care or single-living old people in addition to the activation of the local community described above.

For example, the medical practices are conducted centering on medical institutions such as clinics and hospitals, but as a super-aging medical society comes in the future, tightness of medical resources is inevitable, and switching to visiting medical care and home care is important. However, in such visiting medical care, if all the households are visited by visiting each household, the number of persons whom one medical doctor can see decreases. In this case, there is a possibility that a visiting interval for each patient is large, and a doctor is likely to a visit after it proceeds to a serious situation.

On the other hand, if it is possible to observe an approximate state of a person located indoors in the way without goes into a house by applying the information processing system 1 according to the present disclosure, it is possible to observe a target person in an area between visits, and it is possible to determine in advance whether it is necessary to have a house visit or carry out nursing care after entering the house. A description will proceed below with reference to FIG. 13.

Figure 13:
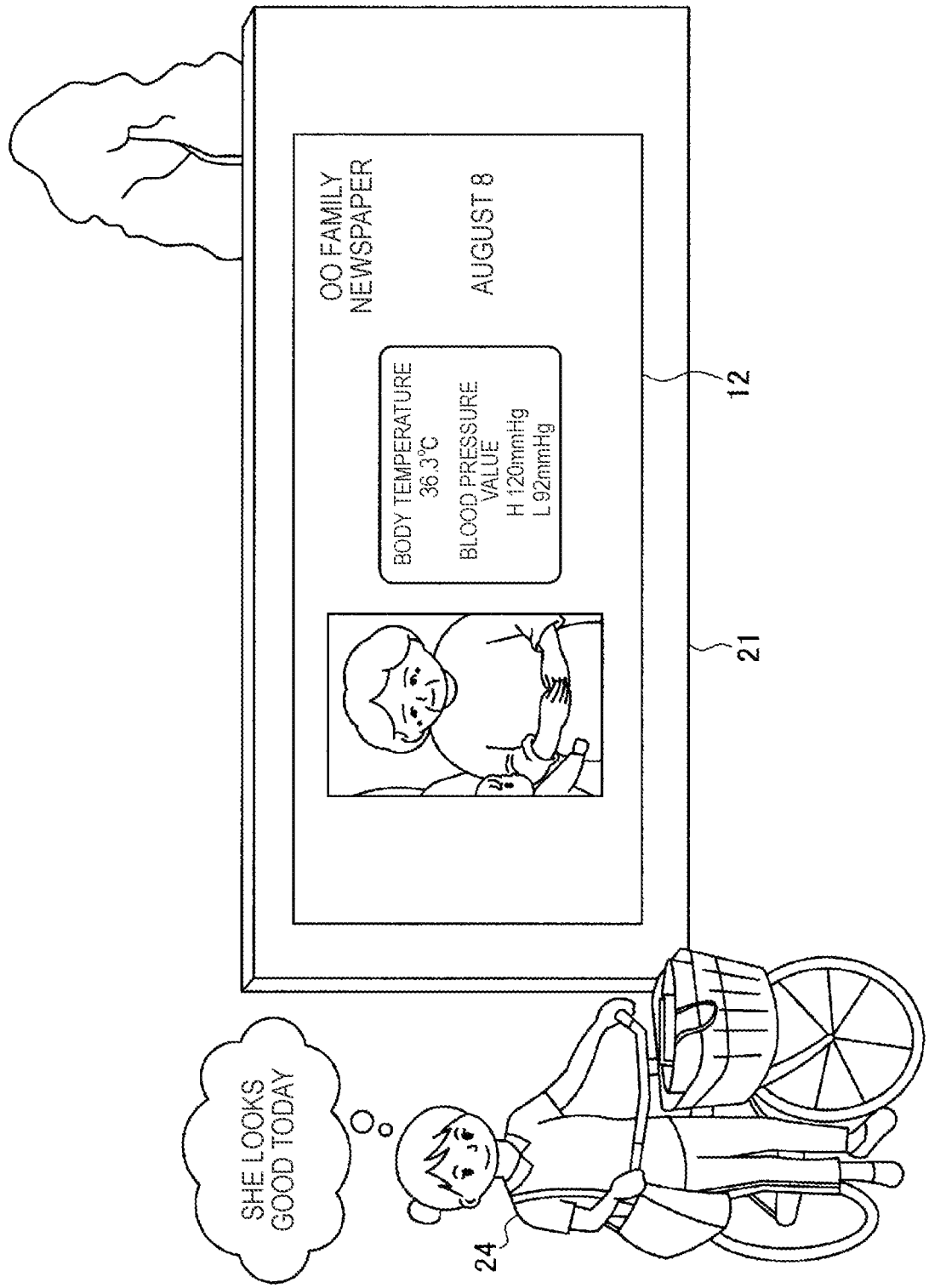
FIG. 13 is a diagram illustrating a display example of image content corresponding to visiting medical care according to a sixth embodiment.

FIG. 13 is a diagram illustrating a display example of image content corresponding to visiting medical care according to the present embodiment. As illustrated in FIG. 13, for example, if bio-information (a body temperature, blood pressure, a perspiration amount, an amount of exercise, a heartbeat, and a pulse), health information (a sleeping time, a caloric intake, a meal time, and the like), and medical practices (content of medicine being taken, the presence or absence of medicine being taken, and treatment content) of an person located indoors are acquired and displayed on the output apparatus 12 of the fence 21, a medical staff 24 check the basic bio-information and the like when passing in front of the house and determines whether or not a home visit is necessary. The bio-information and the health information may be automatically detected by a wearable apparatus worn on the user located indoors and transmitted to the control unit 11 or may be transmitted from a sphygmomanometer or the like to the control unit 11 via a home network in a case in which the user uses a sphygmomanometer or the like at home. Further, information that should be disclosed only to a limited number of people such as medical practices among the above information may be displayed only when a person eligible for seeing it is authenticated by an appropriate method such as a password, a card touch, biometrics authentication, or the like.

Further, if the control unit 11 determines that there is a person who needs medical intervention other than an elderly person on the basis of information of various types of biosensors or the like, a notification is given to a medical institution, so that an opportunity to observe a pre-symptomatic state can be given.

Further, in recent years, faceless relationships have recently increased in condominiums or the like as compared with decades ago when porches or the like are common places. As the super aging society is added there, single-living old person problems are increasing as well. In the worst case, there is a situation in which it leads to solitary death, and it takes time to discover.

On the other hand, according to the information processing system 1 according to the present embodiment, the feeling or the state of the inside of the house is notified to the outside, and thus it can be useful for (mutual) assistance with the neighboring residents for single-living old persons, solitary families, families in which an orphan is raised, or the like.

3. Emergency Response

3-1. Panic Detection

The information processing system 1 according to the present embodiment can activate the area communication in normal circumstances in each of the above described embodiments. On the other hand, in a case in which an emergency situation occurs indoors, it is possible to notify the neighbors of the emergency situation. Such an emergency response will be described below with reference to FIGS. 14 to 16.

Figure 14:
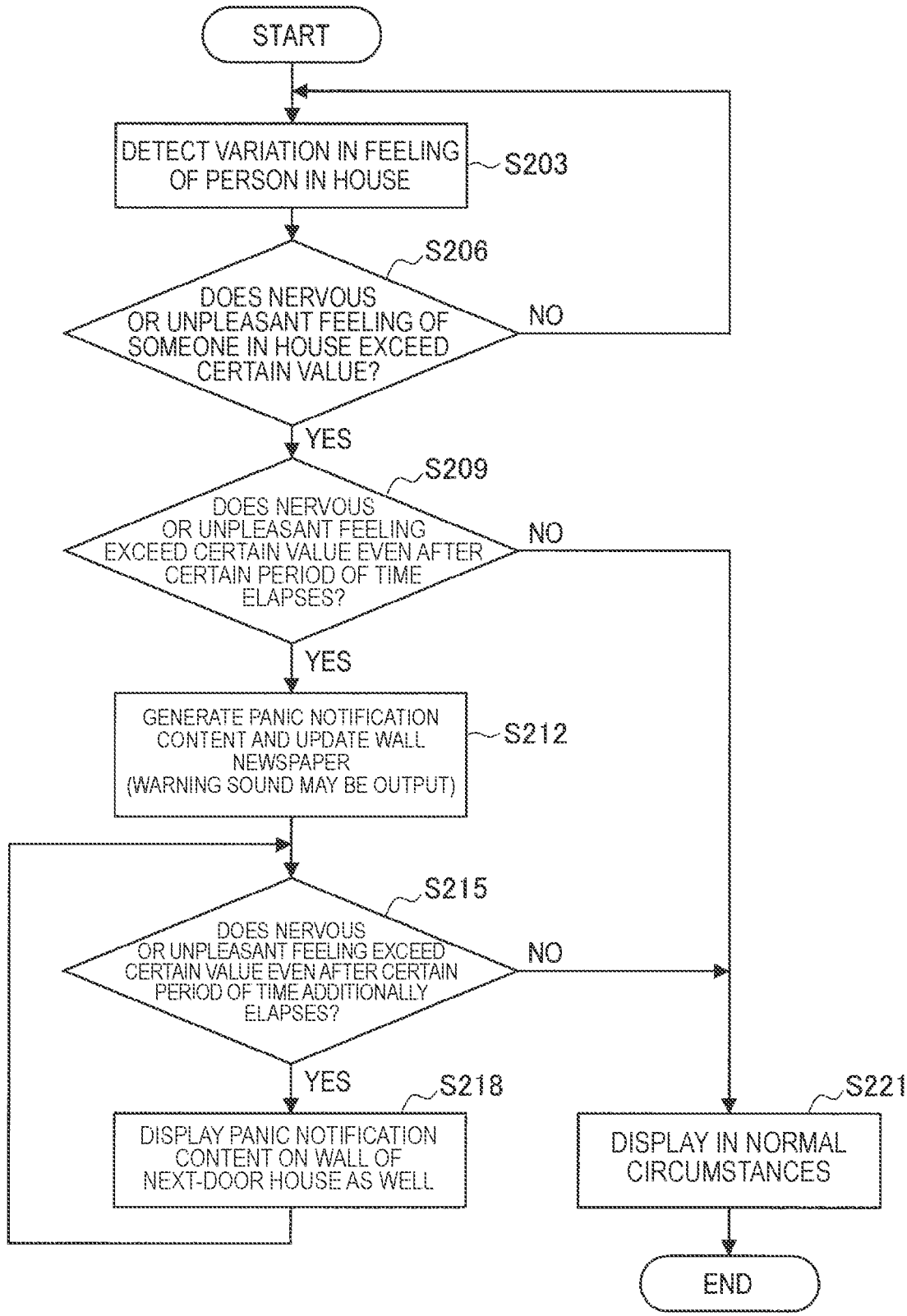
FIG. 14 is a flowchart illustrating an operation process when an emergency situation occurs in an information processing system according to one embodiment of the present disclosure.

FIG. 14 is a flowchart illustrating an operation process when an emergency situation occurs in the information processing system 1 of the present embodiment. As illustrated in FIG. 14, the information processing system 1 first detects the variation in the feeling of the person in a house by the feeling detector 10 (step S203).

Then, in a case in which a variation in a nervous or unpleasant feeling of someone in a house exceeds a certain value (Yes in step S206), the control unit 11 determines that an emergency situation (panic state) such as a fire or a crime is likely to occur indoors. Further, the control unit 11 may determine the panic state on the basis of a sum or any one of nervous or unpleasant feeling values or on the basis of whether or not a weighted value thereof exceeds a certain value.

Then, in a case in which the panic state is continued even after a certain period of time elapses (Yes in step S209), the control unit 11 generates panic notification content and updates the wall newspaper image of the output apparatus 12 (step S212). At this time, the control unit 11 may cause a warning sound to be output from the output apparatus 12. For example, the panic notification content is image content including a display indicating that it is in the panic state and a captured image around a person determined to be in the panic state. Here, FIG. 15 illustrates a display example of the panic notification content according to the present embodiment. As illustrated in the upper part of FIG. 15, the wall newspaper image content described in the first to seventh embodiments is displayed on the output apparatus 12 of the fence 21 in the normal circumstances. On the other hand, in a case in which the panic state is detected indoors, it is updated to panic notification content including a display indicating that it is in panic and a captured image of a panic situation as illustrated in a lower part of FIG. 15. Accordingly, it is possible to give a notification indicating that the panic state is continued indoors to the neighboring residents passing in front of the house.

Further, in the present embodiment, in a case in which the panic state is continued for a certain period of time after the panic state is detected, a notification indicating the panic state is given from the output apparatus 12 to the outside. Accordingly, even in a case in which the panic state is detected temporarily, but a person located indoors copes with it by her/himself and calms it down, the notification can be prevented from being given to the outside.

Then, in a case in which the panic state is continued even after a preset predetermined time additionally elapses (Yes in step S215), the control unit 11 performs control such that the panic notification content is displayed even on the wall of the next-door house (specifically, the output apparatus installed in the wall) (step S218). As long as the panic state is continued, the control unit 11 repeats steps S215 and S218, and as the panic state is prolonged, a notification range is increased by interlocking with the information processing systems of the neighboring houses such as next two houses and then houses next to it. Further, this chain may be continued as long as possible or may be stopped within a predetermined range.

Further, in a case in which the panic state is solved (No in step S209 and No in step S215), the control unit 11 causes the displays in the normal circumstances to be displayed from the output apparatus 12 (performs control such that it returns to the original state in a case in which switching to the panic notification content is performed) (Step S221).

As described above, in the information processing system 1 according to the present embodiment, in the emergency situation, the panic notification content is displayed on the output apparatus 12, so that a notification indicating an abnormal situation can be given to neighboring residents. Further, in the operation process illustrated in FIG. 14, only the notification from the output apparatus 12 has been described as the response when the panic state is detected, but the present embodiment is not limited thereto, and for example, as a first step, a panic notification may be given to a registered house depending on a degree or a duration of the panic state, and as a second step, a notification may be given from the output apparatus 12 to the outside, and as a third step, a notification may be given to a predetermined public agency (a fire department, a police department, a hospital, or the like). In addition to when the panic state is detected, such a display may be performed even when it is interlocked with a fire alarm or when an appropriate trigger is issued from an external eligible person (a resident, a person eligible to enter a house, a security company, a policeman, a firefighter, or a municipal official).

3-2. Search Notification

Further, the information processing system 1 according to the present embodiment is not limited to automatically detecting and notifying of an unexpected abnormal situation occurring indoors, and the user her/himself or a person who has received appropriate authority transfer from the user (a care giver, a security company, a neighboring resident, a policeman, a municipal official, or the like) may give a notification to the neighboring residents through the output apparatus 12 by inputting the emergency situation through the manipulation input unit 14.

For example, recently, with the transition to the super-aging society, dementia is increasing. In this case, wandering of the elderly persons with dementia becomes a problem. Actually, in a local wireless-activated disaster warning system, there are also many broadcasts concerning elderly people who are missing in addition to broadcasts about fires, earthquakes, and the like. The local wireless-activated disaster warning system is a broadcast based on a voice, but it is difficult to convey detailed features. Further, it takes time until it is broadcast through the wireless-activated disaster warning system, and a time since wandering starts increases correspondingly, and thus a search range increases.

Figure 16:
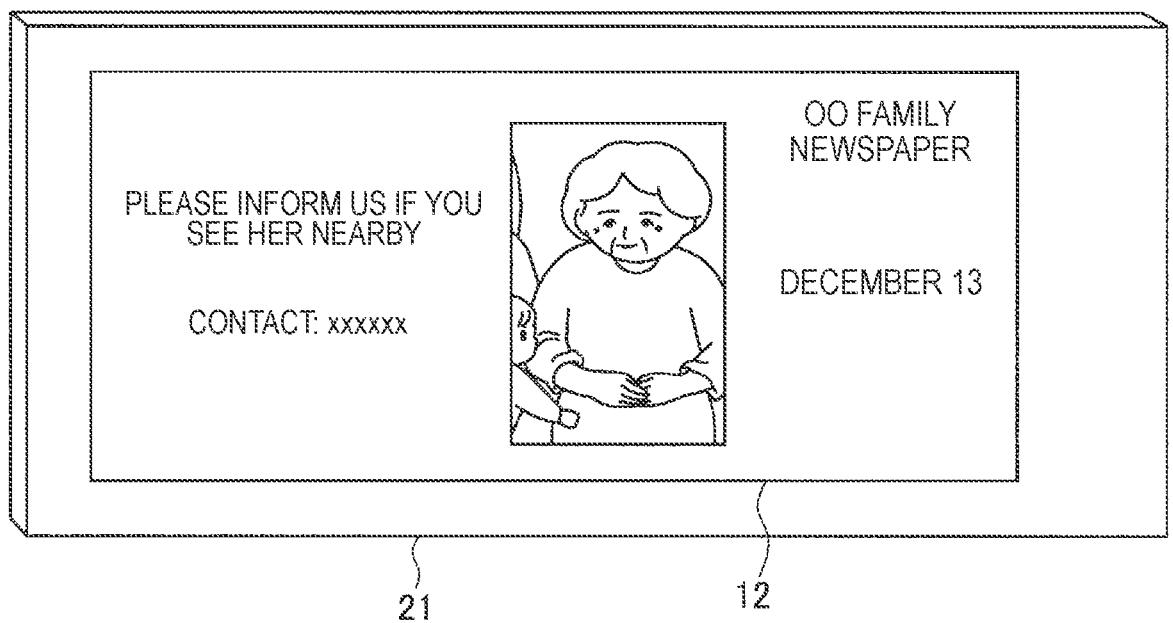
FIG. 16 is a diagram illustrating a display example of a search request according to the present embodiment.

In this regard, according to the information processing system 1 of the present embodiment, for example, as illustrated in FIG. 16, a search request for an elderly person who is missing from home can be immediately displayed on the output apparatus 12 of the fence 21 outside the house, and a notification can be given to the neighbors. At this time, when the captured image of the elderly person is displayed, it is possible to visually notify of the features and help with the search.

Further, if a state of an elderly person or a dweller of a house serving as a target is regularly known to the neighboring residents in accordance with the first to seventh embodiments described above, it can be expected that a neighbor immediately notices that the elderly person goes out from the house in an unnatural form (in which he/she is not wearing shoes or the like) and prevents the elderly person from being missing in advance.

Further, the information processing system 1 according to the present embodiment can cause the output apparatus 12 to further display a moving trajectory of wandering of an elderly person using various kinds of sensor and a behavior recognition technique disclosed in, for example, JP 2016-6612A and JP 2016-6611A and help with the search.

As described above, according to the present embodiment, it is possible to cope with the panic state at the time of abnormality and to take countermeasures against wandering caused by dementia or the like.

4. Hardware Configuration

The embodiments of the present disclosure have been described above. The feeling detector 10, the control unit 11, the audio input unit 13, the manipulation input unit 14, and the communication unit 16 are realized by cooperation of software and hardware of an information processing apparatus 100 described below in the information processing apparatus 100.

Figure 17:
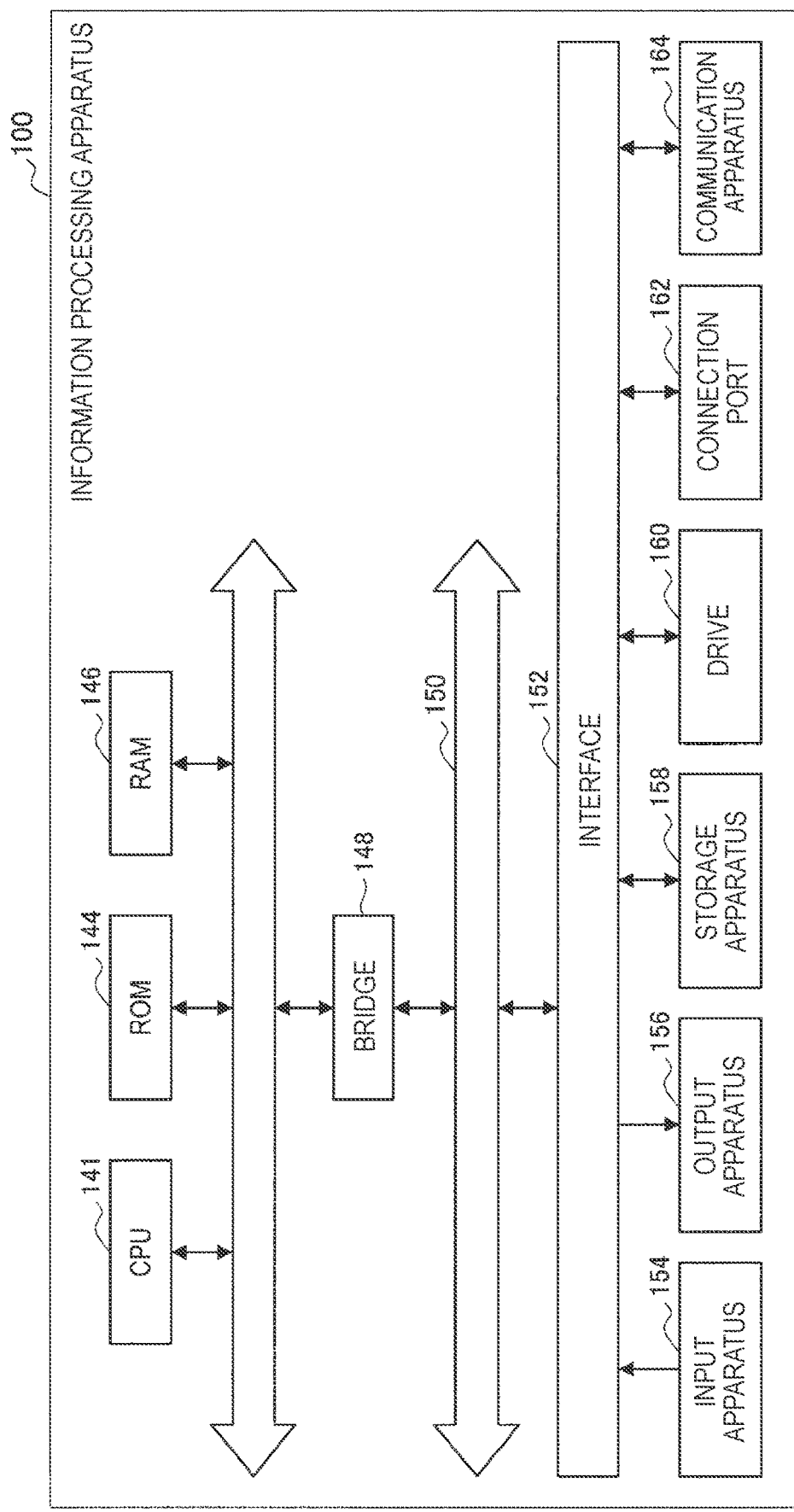
FIG. 17 is an explanatory diagram illustrating a hardware configuration of an information processing apparatus according to the present disclosure.

FIG. 17 is an explanatory diagram illustrating a hardware configuration of the information processing apparatus 100 according to the present disclosure. As illustrated in FIG. 17, the information processing apparatus 100 includes a central processing unit (CPU) 142, a read only memory (ROM) 144, a random access memory (RAM) 146, a bridge 148, a bus 150, an interface 152, an input apparatus 154, an output apparatus 156, a storage apparatus 158, a drive 160, a connection port 162, and a communication apparatus 164.

The CPU 142 functions as an arithmetic processing apparatus and a control apparatus and realizes the operations of the content generating unit 111, the voice recognizing unit 112, the image processing unit 113, and the reproduction content editing unit 114 in the information processing apparatus 100 in cooperation with various kinds of programs. Further, the CPU 142 may be a microprocessor. The ROM 144 stores a program, an operation parameter, or the like used by the CPU 142. The RAM 146 temporarily stores a program used in execution of the CPU 142 or a parameter or the like that appropriately changes in the execution. The ROM 144 and the RAM 146 realize a part of a storage unit (not illustrated) in the information processing system. The CPU 142, the ROM 144, and the RAM 146 are connected to one another via an internal bus constituted by a CPU bus or the like.

The input apparatus 154 is an example of the feeling detector 10, the audio input unit 13, and the manipulation input unit 14 of the information processing system 1, and is constituted by, for example, an input device by which the user inputs information such as a camera, a mouse, a keyboard, a touch panel, a button, a microphone, various kinds of sensors (an acceleration sensor, an angular velocity sensor, a terrestrial magnetism sensor, an illuminance sensor, a temperature sensor, an atmospheric pressure sensor, a biosensor, or the like), a switch, or a lever, an input control circuit that generates an input signal on the basis of imaging of a camera or an input by the user and outputs the input signal to the CPU 142, and the like. The user of the information processing apparatus 100 can input various kinds of data or give an instruction to perform a processing operation to the information processing apparatus 100 by manipulating the input apparatus 154.

The output apparatus 156 performs output to an apparatus such as, for example, a liquid crystal display (LCD) apparatus, an organic light emitting diode (OLED) apparatus, a lamp, or the like. Further, the output apparatus 156 may perform an audio output of a speaker, a headphone, or the like.

The storage apparatus 158 is a data storage apparatus. The storage apparatus 158 may include a storage medium, a recording apparatus for recording data in a storage medium, a reading apparatus for reading data from a storage medium, a deleting apparatus for deleting data recorded on a storage medium, or the like. The storage apparatus 158 stores a program executed by the CPU 142 or various kinds of data.

The drive 160 is a reader/writer for a storage medium and is internally installed in or externally attached to the information processing apparatus 100. The drive 160 reads information recorded in a removable storage medium such as a mounted magnetic disk, an optical disk, a magneto-optical disk, or a semiconductor memory and outputs the information to the RAM 144. Further, the drive 160 can also write information in a removable storage medium.

The connection port 162 is, for example, a bus for connecting with an information processing apparatus outside the information processing apparatus 100 or peripheral devices. Further, the connection port 162 may be a universal serial bus (USB).

The communication apparatus 164 is an example of the communication unit 16 of the information processing system 1 and is, for example, a communication interface constituted by a communication device for establishing a connection with a network. Further, the communication apparatus 164 may be an infrared communication supporting apparatus, a communication apparatus that supports a wireless LAN, or a communication apparatus that supports Long Term Evolution (LTE), or a wired communication apparatus that performs wired communication.

4. Conclusion

As described above, in the information processing system 1 according to the present disclosure embodiment, it is possible to achieve all of crime prevention, disaster prevention, and activation of local community by appropriately conveying an indoor state to the outside while distancing from a physical contact.

According to the present embodiment, relationships in which it is possible to see the face is increased in the area, and it is useful for the crime prevention and the activation of the area. Residents who are concerned about privacy are also assumed, but in recent years, many people are not resistant to sharing their daily lives among limited parties as SNS is prevalent. It is expected that sharing feelings such as delight, anger, sorrow and pleasure emotions in their own lives in a limited range such as an area is useful for building and maintaining a social network.

Further, if the local community is activated as described above, neighboring residents become good counselors when problems or troubles occur in daily life. For example, in recent years, crimes aimed at individuals, particularly, single-living old people including back transfer frauds are increasing steadily. On the other hand, initially, attempts to prevent damage by intensive shoreline operations by ATM or bank tellers or the like have been performed, but currently, it is personalized and decentralized to exchange money in fraud, for example, they come directly to home to receive money or the like. In this case, strengthening the local social network serves as a deterrent. Further, one of reasons why such fraud damage is increasing is because there is no counseling partner who becomes parental to the scandals of the family. According to the present embodiment, the improvement of the local community is expected to be a deterrent to such fraud damage.

Further, in areas in which the area communication is scarce, there is a risk of taking advantage of some's weakness, and socially vulnerable people are likely to hide their own information. Public assistance is involved in a case in which it is threatening life, in a piggyback type society in which a population pyramid is a reverse pyramid, and the majority of people are socially vulnerable people (in the sense that it costs social security expenses), public assistance is unlikely to reach everywhere. In such a society, it is urgent to reconstruct the local community, and when the local community is constructed in addition to the countermeasures against individual crimes and wandering described above or the like, the regional unity is enhanced, and in addition to the security effects, effects of various improvements of living in the entire area such as planning of events by residents, introduction of better infrastructure by joint purchase, and the like are expected.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program causing hardware such as the CPU, the ROM and the RAM installed in the above information processing system 1 to implement the function of the information processing system 1. Further, a computer-readable storage medium having the computer program stored therein is also provided.

Further, the output apparatus 12 is not limited to one installed in the wall or the fence of the house and may be installed in a front door, a window, a post, a gate, or the like which is at the boundary between indoor and outdoor, and the output apparatus 12 may be installed near by the house.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system, including:
a detecting unit configured to detect a feeling of one or more persons located indoors on the basis of sensor data obtained by sensing an indoor state; and
a control unit configured to perform control such that a captured image obtained by imaging the indoor state is output to an outdoor display apparatus in a case in which a value of a feeling of at least any one person among the detected feelings satisfies a predetermined condition.

(2)

The information processing system according to (1), in which, in a case in which a value of a nervous or unpleasant feeling detected by the detecting unit exceeds a predetermined threshold value, the control unit performs control such that a display for notifying of an emergency situation is output to the outdoor display apparatus together with the captured image.

(3)

The information processing system according to (2), in which, in a case in which a state in which the value of the nervous or unpleasant feeling exceeds the threshold value is continued for a predetermined period of time, the control unit performs control such that a notification is given to a predetermined notification destination.

(4)

The information processing system according to any one of (1) to (3), in which the detecting unit detects a feeling on the basis of the captured image obtained by imaging the indoor state as the sensor data.

(5)

The information processing system according to any one of (1) to (4), in which the control unit performs control such that, in conjunction with the outdoor display apparatus, the captured image obtained by imaging the indoor state is also output to an outdoor display apparatus of a neighboring house.

(6)

The information processing system according to any one of (1) to (5), in which the control unit
recognizes an audio signal obtained by collecting a sound indoors and converts the audio signal into text, and
performs control such that the converted text is displayed together with the captured image.

(7)

The information processing system according to any one of (1) to (6), in which the control unit processes the captured image obtained by imaging the indoor state and outputs the processed captured image to the display apparatus.

(8)

The information processing system according to any one of (1) to (7), in which the control unit also outputs bio-information of a predetermined user to the display apparatus.

(9)

An information processing apparatus, including:

a detecting unit configured to detect a feeling of one or more persons located indoors on the basis of sensor data obtained by sensing an indoor state; and a control unit configured to perform control such that a captured image obtained by imaging the indoor state is output to an outdoor display apparatus in a case in which a value of the detected feeling satisfies a predetermined condition.

(10)

An information processing method, including:

detecting, by a processor, a feeling of one or more persons located indoors on the basis of sensor data obtained by sensing an indoor state; and performing, by the processor, control such that a captured image obtained by imaging the indoor state is output to an outdoor display apparatus in a case in which a value of the detected feeling satisfies a predetermined condition.

(11)

A program causing a computer to function as:

a detecting unit configured to detect a feeling of one or more persons located indoors on the basis of sensor data obtained by sensing an indoor state; and a control unit configured to perform control such that a captured image obtained by imaging the indoor state is output to an outdoor display apparatus in a case in which a value of the detected feeling satisfies a predetermined condition.

REFERENCE SIGNS LIST 1, 1-1 to 1-5 information processing system
10 feeling detector
11, 11a to 11e control unit
12 output apparatus
13 audio input unit
14 manipulation input unit
15 content reproducing apparatus
16 communication unit
17 input apparatus
20 house
21 fence
22 camera
100 information processing apparatus
111, 111a to 111e content generating unit
112 voice recognizing unit
113 image processing unit
114 reproduction content editing unit

The invention claimed is:

1. An information processing system, comprising:
a detecting unit configured to detect a feeling of one or more persons located indoors based on sensor data, wherein the sensor data is obtained based on an indoor state sensed by a sensor; and
a control unit configured to:
output a captured image to an outdoor display apparatus, wherein
the captured image is obtained based on capture of an image of the indoor state, and
the captured image is output to the outdoor display apparatus based on a value of a feeling of at least one person among the detected feeling of the one or more persons that satisfies a condition; and
output a first notification of an emergency situation to the outdoor display apparatus, wherein
the first notification is output based on a value of at least one of a nervous feeling or an unpleasant feeling, detected by the detecting unit, that exceeds a threshold value, and
the first notification is displayed together with the captured image.

2. The information processing system according to claim 1, wherein based on a state in which the value of the at least one of the nervous feeling or the unpleasant feeling exceeds the threshold value is continued for a determined period of time, the control unit is further configured to output a second notification to a notification destination.

3. The information processing system according to claim 1, wherein the detecting unit is further configured to detect the feeling of the one or more persons based on the captured image as the sensor data.

4. The information processing system according to claim 1, wherein
the control unit is further configured to output the captured image to an outdoor display apparatus of a neighboring house of the one or more persons located indoors, and
the captured image is output to the outdoor display apparatus of the neighboring house along with the output of the captured image to the outdoor display apparatus.

5. The information processing system according to claim 1, wherein the control unit is further configured to:
recognize an audio signal obtained by collecting based on collection of a sound indoors;
convert the recognized audio signal into text; and
display the text together with the captured image.

6. The information processing system according to claim 1, wherein the control unit is further configured to:
process the captured image; and
output the processed captured image to the outdoor display apparatus.

7. The information processing system according to claim 1, wherein the control unit is further configured to output user bio-information to the outdoor display apparatus.

8. An information processing apparatus, comprising:
a detecting unit configured to detect a feeling of one or more persons located indoors based on sensor data, wherein the sensor data is obtained based on an indoor state sensed by a sensor; and
a control unit configured to:
output a captured image to an outdoor display apparatus, wherein
the captured image is obtained based on capture of an image of the indoor state, and
the captured image is output to the outdoor display apparatus based on a value of the detected feeling satisfies a condition; and
output a notification of an emergency situation to the outdoor display apparatus, wherein
the notification is output based on a value of at least one of a nervous feeling or an unpleasant feeling, detected by the detecting unit, that exceeds a threshold value, and
the notification is displayed together with the captured image.

9. An information processing method, comprising:
  detecting, by a processor, a feeling of one or more persons located indoors based on a sensor data, wherein the sensor data is obtained based on an indoor state sensed by a sensor; and
  outputting, by the processor, a captured image to an outdoor display apparatus, wherein
    the captured image is obtained based on capture of an image of the indoor state, and
    the captured image is output to the outdoor display apparatus based on a value of the detected feeling that satisfies a condition; and
  outputting, by the processor, a notification of an emergency situation to the outdoor display apparatus, wherein
    the notification is output based on a value of at least one of a detected nervous feeling or a detected unpleasant feeling that exceeds a threshold value, and
    the notification is displayed together with the captured image.

10. A non-transitory computer-readable medium having stored thereon, computer-executable instructions which, when executed by a computer, cause the computer to execute operations, the operations comprising:
  detecting a feeling of one or more persons located indoors based on sensor data, wherein the sensor data is obtained based on an indoor state sensed by a sensor; and
  outputting a captured image to an outdoor display device, wherein
    the captured image is obtained based on capture of an image of the indoor state, and
    the captured image is output to an outdoor display apparatus based on a value of the detected feeling that satisfies a condition; and
  outputting a notification of an emergency situation to the outdoor display apparatus, wherein
    the notification is output based on a value of at least one of a detected nervous feeling or a detected unpleasant feeling that exceeds a threshold value, and
    the notification is displayed together with the captured image.

11. An information processing system, comprising:
  a detecting unit configured to detect a feeling of one or more persons located indoors based on sensor data, wherein the sensor data is obtained based on an indoor state sensed by a sensor; and
  a control unit configured to:
    output a captured image to an outdoor display apparatus, wherein
      the captured image is obtained based on capture of an image of the indoor state, and
      the captured image is output to the outdoor display apparatus based on a value of a feeling of at least one person among the detected feeling of the one or more persons that satisfies a condition;
    recognize an audio signal obtained based on collection of a sound indoors;
    convert the recognized audio signal into text; and
    display the text together with the captured image.

* * * * *